US010133812B2

(12) United States Patent
Lee et al.

(10) Patent No.: US 10,133,812 B2
(45) Date of Patent: Nov. 20, 2018

(54) SYSTEM AND METHOD FOR FINDING AND PRIORITIZING CONTENT BASED ON USER SPECIFIC INTEREST PROFILES

(71) Applicant: GRAPEVINE6 INC., Toronto (CA)

(72) Inventors: Jonathan Michael Lee, Toronto (CA); Wayne Luis Gomes, Toronto (CA); Michael Thomas Orr, Toronto (CA); Danko Desancic, Toronto (CA); Pankaj Saini, Markham (CA)

(73) Assignee: GRAPEVINE6 INC., Toronto (CA)

( * ) Notice: Subject to any disclaimer, the term of this patent is extended or adjusted under 35 U.S.C. 154(b) by 104 days.

(21) Appl. No.: 14/097,925

(22) Filed: Dec. 5, 2013

(65) Prior Publication Data

US 2014/0156681 A1    Jun. 5, 2014

Related U.S. Application Data

(60) Provisional application No. 61/733,704, filed on Dec. 5, 2012.

(51) Int. Cl.
*G06F 17/30* (2006.01)

(52) U.S. Cl.
CPC .. *G06F 17/30699* (2013.01); *G06F 17/30867* (2013.01)

(58) Field of Classification Search
CPC ......... G06F 17/30867; G06F 17/30699; G06F 17/30864; G06Q 10/10; G06Q 50/01
USPC ....................................................... 707/754
See application file for complete search history.

(56) References Cited

U.S. PATENT DOCUMENTS

| 2008/0294996 | A1* | 11/2008 | Hunt ...................... G06Q 30/02 715/739 |
| 2009/0018996 | A1* | 1/2009 | Hunt ...................... G06Q 30/02 |
| 2009/0222329 | A1* | 9/2009 | Ramer .............. G06F 17/30749 705/14.52 |
| 2009/0240569 | A1* | 9/2009 | Ramer .............. G06F 17/30749 715/864 |
| 2010/0094878 | A1* | 4/2010 | Soroca .............. G06F 17/30035 707/748 |
| 2010/0131835 | A1* | 5/2010 | Kumar .............. G06Q 30/0224 715/205 |

(Continued)

*Primary Examiner* — Hosain T Alam
*Assistant Examiner* — Nicholas E Allen
(74) *Attorney, Agent, or Firm* — Norton Rose Fulbright Canada LLP; Niall Cooney

(57) ABSTRACT

A personalized content delivery computer system is provided comprising: (a) one or more server computers; (b) a server computer program which when executed provides: a content interest profile builder; and a content matching utility; wherein the content interest profile builder and content matching utility are linked so as to enable users of the platform interested in targeting ("targeting users") one or more other users ("consumer" or "consumers"), using content that is likely to be of interest to the consumer; wherein the content interest profile builder intelligently harvests interest parameters for consumers, and stores the interest parameters iteratively into a content interest profile maintained for each consumer; and wherein the content matching utility determines whether content is likely to be of significant interest to a consumer, using the content interest profile for the consumer. A related method is also provided.

28 Claims, 11 Drawing Sheets

(56) References Cited

U.S. PATENT DOCUMENTS

| | | | |
|---|---|---|---|
| 2012/0095976 A1* | 4/2012 | Hebenthal | G06F 17/30867 707/706 |
| 2012/0150874 A1* | 6/2012 | Sweeney | G06F 17/2785 707/749 |
| 2012/0179642 A1* | 7/2012 | Sweeney | G06F 17/2785 706/55 |
| 2012/0209795 A1* | 8/2012 | Glickman | G06Q 30/0201 706/12 |
| 2012/0221964 A1* | 8/2012 | Markel | G06Q 50/01 715/753 |
| 2012/0233191 A1* | 9/2012 | Ramanujam | G06F 17/30867 707/758 |
| 2012/0254917 A1* | 10/2012 | Burkitt | G06F 17/30817 725/40 |
| 2012/0278164 A1* | 11/2012 | Spivack | G06Q 10/10 705/14.52 |
| 2012/0290950 A1* | 11/2012 | Rapaport | H04L 51/32 715/753 |
| 2012/0296974 A1* | 11/2012 | Tabe | G06Q 50/01 709/204 |

* cited by examiner

Fig. 8

Technology Executives in Marketing (edit)
Contains: 47 Members
Last share: 7 days ago

[Update Cluster]

Cluster Settings

Add a member    Search connections    [Go]

Cluster Members    Filter V

Member 1
Current Position Title, Current Position Company Industry
LinkedIn (1st Degree), Twitter (Following, Follower), Facebook(No Connection)
Toronto, ON, Member since Jan 2013
Edit
Remove Member 2
Current Position Title, Current Position Company Industry
LinkedIn (1st Degree), Twitter (Following, Follower), Facebook(No Connection)
Toronto, ON, Member since Jan 2013
Edit
Remove Member 3
Current Position Title, Current Position Company Industry
LinkedIn (1st Degree), Twitter (Following, Follower), Facebook(No Connection)
Toronto, ON, Member since Jan 2013
Edit
Remove

SYSTEM AND METHOD FOR FINDING AND PRIORITIZING CONTENT BASED ON USER SPECIFIC INTEREST PROFILES

CROSS REFERENCE TO RELATED APPLICATION(S)

This application claims all benefit, including priority, of U.S. Provisional Patent Application Ser. No. 61/733,704, filed on Dec. 5, 2012, the entire contents of which is incorporated herein by this reference.

FIELD

The present invention relates generally to internet-enabled platforms for finding and filtering content for users. The present invention relates more particularly to web platforms for deriving user interests and subsequently matching content to those interests.

BACKGROUND

Numerous platforms and solutions are known for finding and filtering content for users, however, these generally have not been developed with the intent of finding content to share.

Sharing content builds relationships. When one person (a user) shares highly relevant content with another person (a consumer) the user is performing a service for the consumer. This service saves the consumer time and effort that would have been spent searching for relevant content. It may also provide information to the consumer that they would not have otherwise seen.

Sharing content can also reduce discovery time, which may be valuable specially for time-sensitive information. Also, finding relevant content for a consumer requires a deep knowledge of them, for example their interests, likes and dislikes, current challenges, and history. Sharing this content demonstrates to the consumer that the user cares about their relationship with the consumer. The user also expressly demonstrates that the user is actively thinking about the consumer and their relationship.

Relationship managers understand the value of sharing content but their challenge is sometimes is that relevant content is not easily found. The common approach to finding relevant content is to monitor specific channels of interest from a specific source, for example reading the technology section of the New York Times™ or the Mashable™ blog. Although this approach generally assures good quality content, relevance is unpredictable because the category (for example "technology") is generally too broad. The approach must be more targeted to be efficient in finding highly relevant content for others.

Developments in the field by news aggregators (Alltop-.com™, Google News™, Feed.ly™, Prismatic™) or search services (Google Alerts™) have increased relevance by expanding the sources and narrowing categories to topics or keywords. Instead of browsing through technology articles from a single source, it is now possible to select the relevant topics in "technology", for example "mobile applications" or "enterprise security" across multiple sources. The problem with these services is that they are designed to present a high volume of current, topically relevant items and to do that they must sacrifice specificity. Instead of finding one article that meets all of the topics of interest and that is therefore highly relevant, the prior art platforms or tools will generally find many for each topic articles that are relevant for the topic but that may or may not be relevant to a set of interests.

Additionally, effort is needed to select the topic feeds or enter the keywords to monitor. This is worthwhile when mining content for oneself but does not scale to mining content for several relationships that a user may be managing. Also, when executing relationship management tasks, streams of information are required rather than on-demand search services. For example a salesperson may need to contact a client about a new service and needs a news article to engage them immediately.

Web search can be used to find articles of interest on demand but the most common search engines (Google Search™, Microsoft Bing™) are built for general utility and they are limited in serving this specific need. Queries generally must be manually developed by reviewing known information about the contact and determining which keywords to use and how to structure the query to return articles that are specifically relevant to the interest set of the contact. This is not a trivial task and cab exceed the search expertise of most users.

Content is not limited to news articles and other traditional web documents. The rise of social media presents a new search challenge and opportunity. Finding people for introductions, new sales leads, or to fill jobs, is now possible at scale and with a high degree of precision. The challenge is very similar to other content types—how does one mine all of that content (profiles, publications, network relationships) efficiently.

The present invention has been developed with a view to the foregoing considerations.

SUMMARY

A personalized content delivery computer system is provided comprising: (a) one or more server computers; (b) a server computer program which when executed provides: a content interest profile builder; and a content matching utility; wherein the content interest profile builder and content matching utility are linked so as to enable users of the platform interested in targeting ("targeting users") one or more other users ("consumer" or "consumers"), using content that is likely to be of interest to the consumer; wherein the content interest profile builder intelligently harvests interest parameters for consumers, and stores the interest parameters iteratively into a content interest profile maintained for each consumer; and wherein the content matching utility determines whether content is likely to be of significant interest to a consumer, using the content interest profile for the consumer.

In a further aspect, the computer system uses (A) at least one target entity, that is used by the content interest profile builder to extract key terms and interests, and construct the consumer interest profile and (B) a candidate entity collection comprising structured data organized in an information domain that Is relevant for targeting consumers.

A computer system, wherein the interest profile builder also includes or links to a semantic engine to assess, extract and supplement the meaning of key terms and interests extracted by the interest profile builder, which are then built into the applicable content interest profile.

A computer system, wherein the candidate entity collection consists of a variety of content objects such as social media profiles, news articles, or whitepapers. The computer system of claim 1, wherein the system includes a dashboard that enables targeting users to supplement content interest profiles with their own information and insights regarding consumers, thus enriching the content interest profile with personal insight.

A computer system wherein the content matching utility dynamically generates a matching profile for the consumer to optimize the matching of available content objects to the current content interest profile for the consumer.

A computer system wherein the structure of the content interest profile and of the matching profile is complementary, thereby enabling close matching of content to interests, and also enabling matching of different types of content.

A computer implemented method for finding content relevant to at least one consumer comprises:

identifying one or more consumers;

using a content interest profile builder to access one or more data sources and build a base profile for each consumer;

optionally providing a tool for one or more targeting users to supplement the base profiles; dynamically analyzing one or more data sources to update the base profile for each consumer;

(i) optionally clustering consumers to identify clusters of consumers with a common interest and determining a collective common interest profile for each cluster of consumers; and (ii) mapping each consumer to one or more clusters of consumers based on similarity of content interests, analyzing the current state of each content interest profile to determine whether the content interest profile may benefit from enhancing the content interest profile based on information available from the mapped one or more collective common interest profiles, and if so updating the consumer's content interest profile based on information from the mapped collective common interest profiles;

dynamically generating a matching profile for matching available content objects to one or more consumers based on their current content interest profiles and one or more other matching parameters;

generating from the content objects a set of matched entities;

optionally displaying the matched entities to a targeting user for enabling the targeting user to initiate further filtering and/or matching operations, thereby optionally generating an updated set of matching entities; and optionally making the matched entities available to the consumer, the matched entities having a substantial likelihood of being of interest to the consumer at the time they are made available to the consumer.

In another aspect, the method comprises automating the communication of the matched entity to the consumer, or group of consumers, or to an intermediary by generating the message based on the content interest profile and the matched content In another aspect, the method includes the further step of optionally executing a further match of the target consumer interest profile to a collection entities consisting of consumer profiles within the user's social graph or similar collection to generate a new collection of matched entity profiles.

In another aspect, a personalized content delivery computer system is provided comprising: at least one computing device, and a content interest profile and a content matching utility executable by the computing device; wherein the content interest profile builder and content matching utility are linked so as to enable users of the platform interested in targeting ("targeting user") one or more other users (the "consumers"), using content that is likely to be of interest to the consumer; wherein the content interest profile builder includes an inference engine that (i) intelligently collects content interest parameters for the consumer, by extracting from one or more target entities associated with the consumer, such as a profile maintained by or for the consumer or articles or documents associated with the consumer, one or more data elements that are relevant to content interest, and that (ii) analyzes the data elements so as to construct, including iteratively, a content interest profile that includes a series of topics that the consumer is substantially likely to have a significant interest in; wherein the content matching utility is responsive to a request to target the consumer with content likely to be of significant interest to the consumer by analyzing a collection of content items within an information domain that is relevant to the consumer based on their content interest profile ("candidate entity collection") so as to predict a subset of content items from the candidate entity collection that are most likely to be of significant interest to the consumer ("matched entities"), and generate a list of such matched entities.

In another aspect, the system generates matched entities that are substantially likely to be of interest to the consumer in real time or near real time.

In a still other aspect, the content interest parameters include extracted key words and interests, and wherein the interest profile builder also includes or links to a semantic engine to analyze and supplement the meaning of the key terms and interests, which the interest profile builder builds into the applicable content interest profile.

In yet another aspect, the candidate entity collection consists of a variety of content objects such as social media profiles, news articles, or whitepapers.

In a still other aspect, the system includes a dashboard that enables targeting users to supplement content interest profiles with their own information and insights regarding the consumer, thus enriching the content interest profile with personal insight.

In another aspect of the system, the dashboard enables a targeting user to deselect matched entities.

In another aspect of the invention, the content matching utility dynamically generates for the consumer a matching profile for optimizing the matching of matched entities to the current content interest profile for the consumer.

In another aspect, the structure of the content interest profile and of the matching profile is complementary, thereby enabling close matching of content to interests, and also enabling matching of different types of content.

In a still other aspect, the system identifies common interests between the targeting user and the consumer thereby providing commonality between the targeting user and the consumer for effective engagement between them.

In another aspect, the computer system comprises a content delivery platform that when executed enables the delivery of matched entities to the consumer. The content delivery platform includes a suggestion utility that suggests content for communicating one or more matched entities to the consumer, based on the content interest profile, and based optionally also on communication history for the consumer and the targeting user.

In another aspect, the targeting user is interested in targeting a plurality of consumers, and the system clusters consumers automatically, and iteratively, into groups of consumers with similar interests, Groups of consumers are clustered based on common interests amongst a cluster, or common interests amongst a cluster and additionally the targeting user.

In another aspect, the inference engine is configured to extract content interest parameters from different types of target entities, including different online profiles associated with different Internet platforms (including social networking platforms), data feeds from micro-blogging sites, content websites, and online news services.

In another aspect of the system, the content interest profile builder automatically connects to sources of target entities, looks for updates, extracts new content interest parameters from updates, and automatically updates the applicable content interest profile.

In another aspect of the invention, the system is configured to iteratively analyze and the content interest profiles, and search for and acquire information from additional target entities, and process such additional target entities using the content interest profile builder, and based on this information update the applicable content interest profile.

In yet another aspect, a method performed by at least one computing device is provided for targeting one or more entities using content comprising: identifying one or more content consumers ("consumer"); generating a content interest profile for at least one consumer at the at least one computing device by: collecting content interest parameters for the consumer, by extracting from one or more target entities associated with the consumer, such as a profile maintained by or for the consumer or articles or documents associated with the consumer, one or more data elements that are relevant to content interest; analyzing the data elements so as to construct, including iteratively, a content interest profile that includes a series of topics that the consumer is substantially likely to have a significant interest in; processing a request to target the consumer with content likely to be of significant interest to the consumer, and based on such request: analyzing a collection of content items within an information domain that is relevant to the consumer based on their content interest profile ("candidate entity collection") so as to predict a subset of content items from the candidate entity collection that are most likely to be of significant interest to the consumer ("matched entities"), and generating a list such matched entities.

In at still this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE DRAWINGS

Embodiments will now be described, by way of example only, with reference to the attached figures, wherein:

FIG. 8 is a diagram representing a possible user interface for accessing functions of the computer system of the present invention, namely for modifying consumer cluster attributes.

Figure 1:
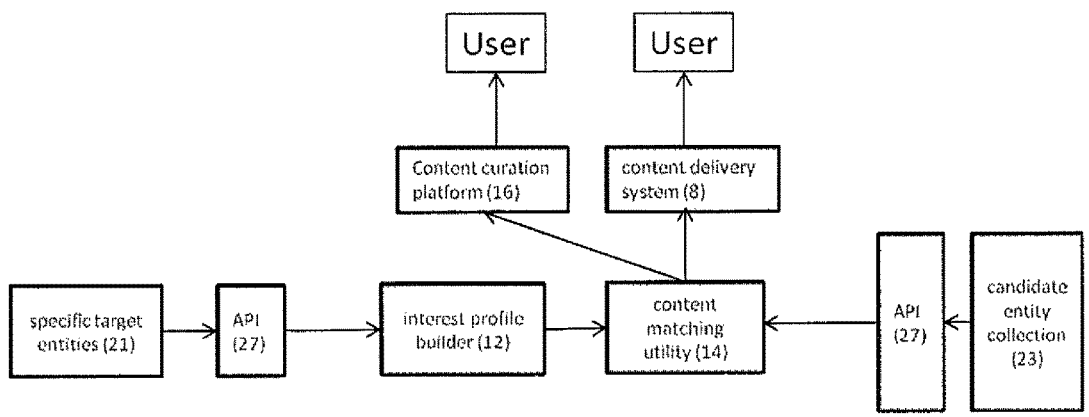
FIG. 1 illustrates a schematic diagram depicting a high level view of the computer system of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

As shown in FIG. 1, in one aspect of the invention a personalized content delivery system (10) is provided. The content delivery system (8) is part of a computer network implemented computer system or platform (the "platform") (10) that includes or links to: (A) the content interest profile builder (12) described below; and (B) the content matching utility (14) or matching engine, also described below.

Figure 4:
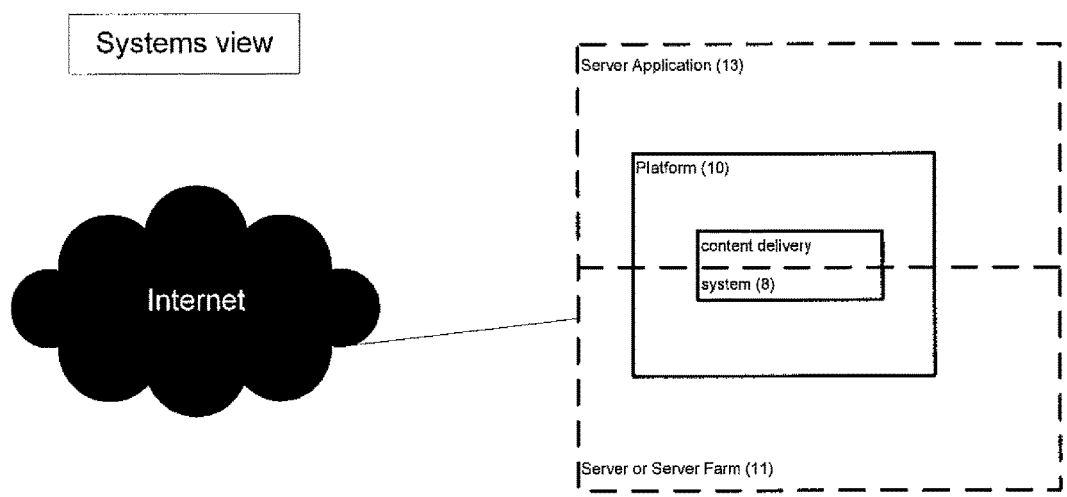
FIG. 4 illustrates at a high level a possible computer system implementation of the present invention.

The platform may include a server (11) (which may be implemented as a server farm or as part of a cloud network implemented service) and a server application (13) (or application repository) that implements the various features and functions of the present invention, and may include a plurality of different modules or software utilities for enabling the functionality described. The server (11) is connected to the Internet so as to provide online access to the various features and functions of the server application (13). A high level view of the platform is shown in FIG. 4.

The platform includes one or more tools that enable users of the platform interested in targeting ("targeting user") one or more other users ("consumer" or "consumers"), using content that is likely to be of interest to the consumer. The term "consumer" refers to various types of entities (whether an individual, business, or government entity) who may be targeted using the platform (10). The term "consumer" is selected because ultimately the entity or entities in question consumes the content, that is more relevant and meaningful by operation of the present invention, and that is pushed or pulled using the platform (10). "Consumers" may also be referred to as "content consumers" to better circumscribe the meaning of this term. Generally speaking "promoting" content refers to making content available to consumers using the platform (10), whether this is by pushing content to consumers, or enabling consumers to pull selected content. A skilled reader will appreciate that the present invention extends to and contemplates the use of various content delivery mechanisms, and can be adapted to or integrated with various existing Internet platforms and/or content delivery platforms.

In one aspect of the invention, the platform enables the pushing of content that is likely to be of interest to a particular consumer, or a group of consumers having a common or similar content interest profile, in a way that is more insightful as to the consumer's interest than prior art systems, platforms, or approaches.

A skilled reader will appreciate that targeting of consumers using content of interest, and that is meaningful to the consumers, can have numerous applications. Generally speaking, the platform may be used to enable targeting users to develop and deepen their business or social relationships with consumers. An important application of the invention is obviously the use of the platform for sales/marketing purposes, for example in connection with a customer relationship management ("CRM") platform or marketing automation platform. A skilled reader will also appreciate that various other applications of the technologies described are also possible. For example, other possible applications may include a personalized news platform (for example in connection with an Internet TV platform or an electronic reader application or device), profile based information retrieval. An additional application would be to profile the entire audience of a targeting user to enable segmentation of the audience and content matching to aggregate interests. Further details regarding such applications are provided below.

Figure 2:
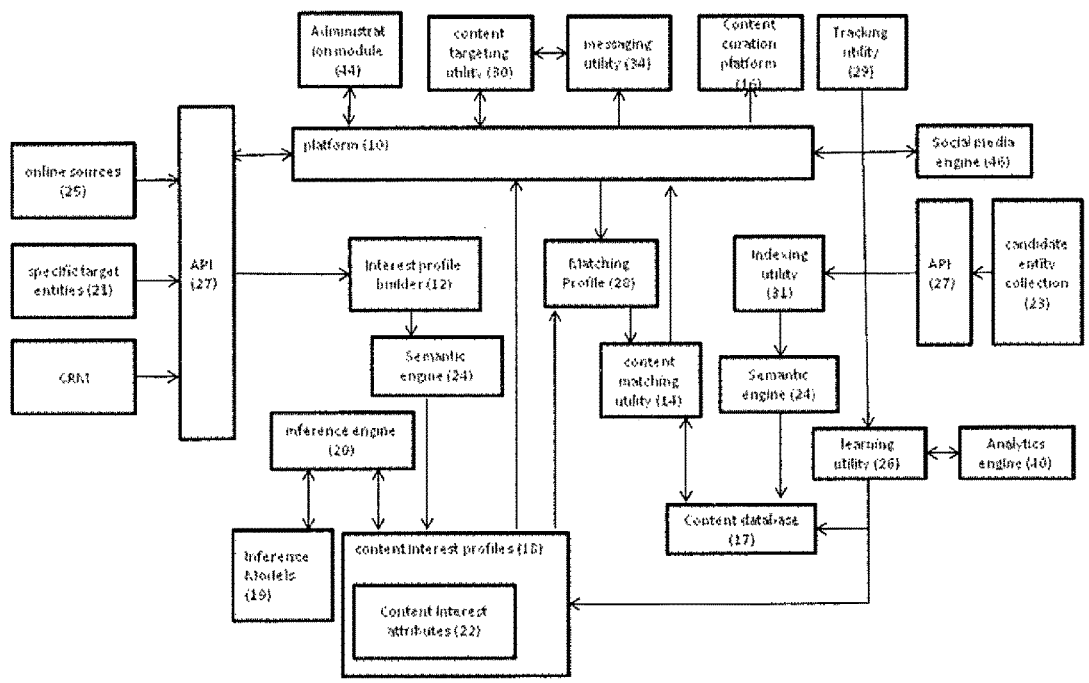
FIG. 2 is a further schematic diagram depicting a more detailed view of the computer system of the present invention.

As shown in FIG. 2, in one implementation of the platform, the invention consists of a content curation platform (16), wherein the platform infers and updates over time a profile (18) for each consumer that enables the automation of curation of digital and social media content for each consumer, including with participation of one or more targeting users who are interested in promoting content that is likely to be of interest to the consumers.

As mentioned above, Internet content platforms and social media platforms provide opportunities to access a wide range of digital content. Sorting through the mass of content to find information that is relevant, even with various prior art filtering tools, is generally very time consuming and the results often are poor (missed information that may be of significant interest, or too many results that are little or no interest to users, wasted time in users reviewing content that is little or no interest to them). There is increased competition for the attention of users from various digital media and social media sources, and the present platform provides a new and innovative mechanism for filtering content, and enabling the delivery to consumers of only the content that is substantially likely to be of significant interest to each consumer on a real time or near real time basis. A skilled reader will immediately appreciate that no prior art solution or platform provides this result, and further that providing such a system represents significant innovation providing important advantages to a range of different users.

Prior art methods have taken a relatively simplistic approach to filtering of content for particular consumers, or closely related groups of consumers. This has resulted in solutions based on filtering of content (such as content curation platforms) that do not enable sufficient relevancy to differentiate from the clutter of digital content that is being used to target more users. Alternatively existing platforms require a significant amount of filtering by humans. Consequently, while the benefits of marketing using content are well understood, Internet platforms that enable individuals to effectively engage in content based marketing, especially to a relatively large number of consumers have either been ineffective or required too much human intervention to achieve desired relevancy and meaning to consumers in a way that is ineffective. This has limited the adoption and use of such Internet platforms, or limited the scale of their use.

In contrast, the present invention enables targeting users to efficiently identify one or more particular information objects that are likely to resonate with one or more consumers based on special affinity between the information objects and the consumer's interests, for example what may be "top of mind" for them at the moment. The interaction between a targeting user and the consumer, based on making available content that is relevant to this degree, can result in engagement of a quality and impact that is not possible using prior art solutions, at least not without the investment of significant time and effort. Therefore in one aspect of the invention, the inventors have contributed to the art a computer system and computer implemented methods that enable, for the first time, a targeting user to achieve interactions of this quality in relation to a relatively large number of consumers, in an efficient and scalable manner.

One aspect of the invention is a number of different features of the profile builder (12) and the content matching utility (14) and how these interrelate to one another, in order to enable the content-based marketing features and functions of the platform (10).

Content Interest Profile Builder

As shown in FIG. 2, the platform includes a content interest profile builder (12) that builds consumer content interest profiles (18) in a novel and innovative way that enables the filtering of content based on relevance to the consumer. Significantly, the content interest profile builder (12) includes or links to an inference engine (20) that infers attributes of consumers over time as it relates to their interest in content ("content interest attributes" (22)).

One insight of the present invention is that a unique and innovative structured profile is provided for collecting the content interest attributes (22).

Another insight of the invention is the functionality of the inference engine (20), as described in this disclosure. The inference engine (20) includes a number of features and functions that are novel and innovative, as described below. More specifically the inference engine (20), in one implementation includes one or more intelligent features that enable the incremental and dynamic enhancement of content interest profiles (18), and also the updating of content interest profiles (18) in real time or near real time in order to enable the platform to reflect the continuous evolution of the interests of consumers. The present invention therefore leverages the expanding ability to track the current interests of consumers because of their increasing consumption of content through digital media and social media platforms. How to capture this information and utilize this information, however, has been a design a technical problem that has escaped those skilled in the art. The present invention provides solutions that resolve these matters in an innovative way.

Another insight of the present invention is the overall architecture wherein the content interest profile (18) is constructed by the platform (10) of the present invention, in a way that matches the matching profile discussed below. The present invention therefore includes a computer system architecture in which (A) the content interest profiles are built and enhanced iteratively and dynamically, (B) and by generating content consumer profiles that have a structure and content that corresponds to a matching profile (28) (as explained below), makes possible deeper matching of content to a consumer's interest than can be accomplished using prior art solutions. A skilled reader will appreciate that this architecture, and how it is implemented, represents an innovative approach to the described problem.

The matching engine (14) is responsible for finding the relevant content for targets selected by the targeting user for one or more consumers. In one implementation, this subsystem requires two inputs for its effective operation: (A) at least one target entity (21), and (B) a candidate entity collection (23). The target entity (21) is the basis used to target one or more consumers. The target entity (21) is processed by the interest profile builder (12) in order to construct a structured content interest profile (18) (or "content interest profile") associated with a consumer (targeted by the targeting user) that defines the attributes of content that is likely to be of interest to the consumer(s). The interest profile builder (12) may additionally invoke a semantic engine (24) to assess, extract and supplement the meaning of key terms and interests extracted by the interest profile builder (12) which would then be included in the content interest profile (18). The interest profile builder may also invoke an inference engine (20) that compares the content interest profile (18) to known inference models (21) to further develop the content interest profile (18).

As explained in greater detail below, certain target entities (21), for example a LinkedIn™ profile, may provide sufficient information to construct a content interest profile (18) that may enable content matching operations that meet the relevance parameters of the present invention. In other cases, the content interest profile (18) may require additional information and/or processing. The integration into the content consumer profile (18) of such additional information and/or the processing required to complete the content consumer profile (18) is performed by the inference engine (20). One contribution of the present invention is the platform (10) design that enables the integration of such additional information and/or processing on an automated basis, as further explained below.

As mentioned earlier, one possible example of a target entity (21) consists of or is based on LinkedIn™ profile, which is processed by the interest profile builder (12) as explained in greater detail below. A skilled reader will appreciate that the inference engine (20) and the associated content interest profile (18) have been designed so that a unitary content interest profile (18) that includes a number of content interest attributes (22) relevant to the consumer's interest may be extracted by the inference engine (20) from a wide variety of different specific target entities (21). The inference engine (20) creates and uses inference models (19) to store the relationships between content interest attributes (22) across a plurality of content interest profiles (18).

In one aspect, the inference engine (20) is configured in order to extract additional information regarding the user's content interest attributes from a variety of different online sources (25). The platform (10) may connect for example to third party platforms so as to capture information relevant to determining the content interests of the consumer, or that enable the consumer to engage in interactions that enable the inference of the contents interests of the consumer. This information or interactions may be captured using a variety of different technologies, techniques, or solutions. Examples of online sources (25) includes for example social media platforms, online news services, TWITTER™, websites with content channels, proprietary consumer survey response databases, and so on. As explained below, the platform (10) includes a proprietary API (27) for connecting to such online sources (25) and extracting information relevant to determine the current interests of consumers. This information is integrated by the interest profile builder (12) into particular content interest profiles (18).

A skilled reader will understand that the platform (10) may incorporate or link to various other technologies or solutions that enhance the platform (10) features or functions. For example the platform (10) may utilize one or more techniques for associating one online handle or identity with another so as to determine that different handles or identities established on different online platforms relate to the same person, and therefore the same content interest profile (18) associated with the platform (10).

In addition, in accordance with the present invention, the interest profile builder (12) is operable to utilize the target entity (21), in order to identify relevant documents in online sources (25) and analyze the relevant documents so as to enhance the content consumer profile (18).

As content is consumed new insight is developed for the content interest profile and assists the platform (10) in continuously improving relevance. A tracking utility (29) monitors consumer's interactions with content delivered by the platform (10). The learning utility (26) processes the feed of interaction data generated by the tracking utility (29) along with topical meta-data related to the specific content items stored in the content database (17). The learning utility (31) then updates the content interest profile for example with a stronger association of a specific interest and also updates the content database (17) for example with a preference to the source of the content item. A skilled reader will immediately appreciate that this approach represents an advantage over prior art technologies or solutions that (in contrast with present invention) generally (A) require significant manual efforts in order to populate a profile similar to the content consumer profile (18), (B) do not enable the identification of matching that yields relatively small numbers of matches with a high degree of relevance, and/or (C) do not permit the matching of a content interest profile to a wide variety of types of source documents.

Entity Structure

One insight of the present invention is the definition of a common structure of an "entity", that may be used by the present invention for both target entities (21) as defined above and also for a candidate entity collection (23) as defined below.

The candidate entity collection (23) may consist for example of a domain of information that is suitable for use in targeting consumers with content. For example, the candidate entity collection (23) may consist of content such as a curated set of authoritative websites or newsfeeds, a proprietary content database (such as a collection of company authored white papers and articles), or a particular database of content records or objects (such as a database containing news items). In some applications, the open Internet may be used, or a combination of the open Internet and curated content.

The candidate entity collection (23) is the group of one or more entities (as defined below) against which the platform (10) matches the target entity (21). Therefore the contents of the candidate entity collection (23) may depend on the context. For example, in the case of content marketing, the collection may be a set of proprietary whitepapers, videos or news articles.

In one implementation, the platform (10) includes an indexing utility (31) that is operable to process content items from different data sources such as web pages, database records, etc., and tag content items so that they are stored to a content database (17) such that they have one or more attributes of an entity, as described below. Target entities (21) also share these attributes. This concordance of target entities (21) and the candidate entity collection(s) (23) enables accurate matching of target entities (21) and candidate entity collections (23), thereby permitting the generation of relevant match results.

The entity structure is relatively flexible thus enabling the processing of a wide variety of content objects using the matching architecture illustrated in FIG. 2. For example, an entity may consist of a wide variety of content objects such as for example a social media profile, news articles, or whitepapers.

This design aspect makes flexibility inherent to the computer system of the present invention. This flexibility: (A) allows matching in accordance with the present invention, even if only partial information is available to define target entities; (B) allows the matching of content based on target entities (21) having different attributes, because content interests can be derived from different sources; (C) allows matching operations to be made against a wide assortment content objects forming part of the one or more candidate entity collections (23); and (D) the computer system is operable to match on similar entity types (e.g. matching an article to an article), i.e. homogenous matching, and also to match dissimilar entity types (e.g. matching a job advertisement to a resume or professional profile), i.e. heterogeneous matching. The particular approach disclosed for development of content interest profiles (18), and to match these to content sources to yield a narrower set of content objects that is likely to be of interest, is highly novel and innovative, and constitutes an important development relative to the state of the art.

In one particular implementation, entities may include the following elements or "attributes":

A format—referring to an instruction that may be used to interpret the data. Typical formats include: standard document formats (XML, HTML, PDF, Word, Excel), Flash formats, digital video formats, digital image formats and digital text formats.

An entity type—referring to the intent or purpose of the content. Examples include profiles, forum posts, activity streams, articles, and documents.

A context—referring to the location or environment the content is situated in. Examples include: proprietary websites, social media platforms, video streaming sites, and publisher websites.

A structure—referring to distinct or implied content sections or attributes. Examples of structure include the heading, body and date in an article or the headline, summary and experience in a profile.

Relationships to other entities—referring to the linked nature of content online. Examples include: a post on a blog that links to a media article, an answer in a collection of answers to a question, explicit social media relationships between identities (friends), data relationships in social media profiles (employer-employee).

The interest profile builder (12) is configured to translate these attributes, and optionally also additional factors, into meaning and importance, as explained below. This meaning and importance is then used to assess relevance. This enables matching of content with a substantially improved degree of relevance than prior to the invention.

Detailed Operation

In one implementation of the invention, the interest profile builder (12) acquires information about a user and consumer automatically, including for example from a variety of online sources such as for example a LinkedIn™ profile, FACEBOOK™ profile, a CRM (e.g. salesforce.com, microsoft dynamics) contact record, and other online sources (25). These online sources may be linked to the server (11) using for example one or more application programming interfaces or APIs (27). In addition, the interest profile builder (12) may process one or more social media profiles for a consumer, and associated broadcast or personal publications (posts or messages respectively), using an input source translation file structure and method.

In one aspect of the invention, the content interest profile (18) may be assembled by the profile builder (12) so as to direct cleaning, structuring and weighting of source content as further explained below.

In one implementation of the invention, the interest profile builder (12) performs one or more key phrase operations in relation to information or documents that form part of the target entity (21) in order to generate the content interest profile (18). Key phrase operations may include extraction which may for example involve parsing out most important and meaningful keywords and key phrases from a source data file. Extraction may utilize Parts of Speech (POS) methods to identify nouns and pro-nouns that form the keywords and key phrases in the relevant source data files. Additionally the content interest profile builder (12) may invoke a semantic engine (24) that categorizes the keywords in meaningful ways and determines related canonical concepts that further complete the content interest profile (18). The semantic engine (24) may also include a custom dictionary of keywords and key phrases that is used in the extraction step.

In another particular aspect of the invention, the interest profile builder (12) bestows meaning and relevance to content consumer profiles (18) by means of extraction of information from source data files, and insertion of the information into a profile source data structure of the present invention as explained below. The profile source data structure may include a) Source (e.g. LinkedIn™, Twitter™, Facebook™)
b) Field (e.g. Summary, Skills, Post, Location)
c) Weight (Numerical Score—see examples below))
d) Content (Text, Images, Video, Audio)
e) Content Date
f) Publish Date
g) Requires Extraction (Yes or No)
h) Relation to Consumer (Connection, Following, Like, Employer)

In an additional embodiment of the system both specific entity and the candidate entity collection (explained further later) are consumer profiles. In this embodiment the system is matching an interest profile to other interest profiles for example on the following dimensions: (i) current position title; (ii) company function; (iii) company size (employee count, revenue); (iv) location; (v) profession; (vi) industry (personal, company); (vii) seniority; (viii) income; (ix) number and quality of connections; and (x) proximity to user.

In this embodiment the specific entity may be an idealized consumer profile created by the user, for example through a wizard or other directed user input collection device. In this embodiment the tracking utility (29) may also function to monitor the behaviour of the user in engaging with consumer profiles in their networks.

In one implementation, extraction involves use of POS methods to identify nouns and pronouns that form the keywords and key phrases in the target entity. These extracted POS terms may be matched against a library that maintains relationships and translations to consolidate/augment/standardize the keywords and key phrases added to the content consumer profile (18). Some content, however, may not require extraction because it is inherently structured.

The semantic engine (24) may then process the keywords to for example standardize terminology, identify related concepts, categorize the concepts or define keyword relationships.

For example: "Applied Science" may be more commonly referred to as "Engineering" in a degree. The system would replace "Applied Science" with "Engineering" as this is the more common and equivalent term.

"Mobile Web Marketing" may be connected to the broader, canonical concept of "Mobile Marketing" and "Web Marketing".

"SAP ERP" is part of a family of applications referred to as "ERP", the system would specifically isolate that key word and may attach additional ERP system names "Oracle".

The inference engine (20) may be operable to enrich the content consumer profile (18) by identifying related inference models (19). The models are given the collection of content interest attributes (22) generated by the interest profile builder (12) and are able to predict based on analysis of similar target entities (21) a further collection of content interest attributes (22). For example, the model for Marketing Executives in Canada may predict a strong interest in Mobile Marketing. This enables development of a more fulsome content consumer profile (18) that better reflects the interests of the user and enables better matching of content as explained below. The inference engine (20) therefore enables enhancement of the content consumer profile (18) to add further meaning and relevance to its contents.

In the recommended implementation of the system, the interest profile builder (12) will calculate relevance for the content interest attributes (22) in the content interest profile (18). The assessment of relevance may be performed by assessing the following dimensions of the source document.

1. Source field weight (e.g. [Summary]=1, [Skills]=1.5)
2. Publication date or update date (posting date)
3. Content date (e.g. Graduation Date, Last Employment Date)
4. Density
5. Phrase Length
6. Uniqueness or specificity
7. Keyword parser relevance score
8. Placement in data (headers, table of index, meta, footer, etc.)
9. Font weight/style.

In one implementation of the invention, the inference engine (20) may operate iteratively and request additional data from the interest profile builder (12) based on the current interest profile (18) to generate a more complete interest profile (18). For example, if the current employer is identified as part of the interest profile, the inference engine (20) may request the interest profile builder (12) source additional information about the company (profile, activity, web pages, directory listing) from online sources (25) to augment the interest profile. In another case, if the consumer has interacted with online persona (A), the platform may request and process that profile (A) to augment the interest profile (18) of the consumer.

The computer system implemented method of the present invention, in one implementation, may consist of:

(a) selecting one or more target entities (21), such as one or more contacts from a LinkedIn™ contacts list or alternatively, a more complex entity such as a CRM contact;

(b) supplementing the one or more target entities (21) for example by the platform (10) optionally integrating the one or more target entities (21) using one or more other entities associated with the target entity, for example by aggregating the LinkedIn™ profile with the user's Twitter™ feed;

(c) analyzing the supplemented content (the new, supplemented target entity (21)), and automatically enhancing the target entity (21) by operation of the platform (10), so as to generate a content interest profile (18). This may involve for example indexing the content of the target entity (21) using one or more semantic analysis operations, and then applying one or more relevancy operations based on the semantically indexed target entity (21), for example based on the rarity of key phrases (including in information or documents known to be associated with the target entity), frequency of occurrence, and length of the text. The relevancy score of the key phrases may be combined with weighting that is already part of the target entity (21) so as to further enhance the target entity (21).

This may also involve a semantic analysis of the candidate entity collection (23) or similar document collection to assess features of the interests for example, the rarity or specificity of an interest, the trend of an interest over time, or the clustering of interests to identify related interests or to identify the independence of interests. These features are used by the interest profile builder in calculating the interest attribute weights. In a specific implementation the analysis of the target entity may be supplemented by an external schedule of interest weights. For example, an interest in retirement savings products may be weighted more highly during the selling season for those products. The resulting information is integrated with the profile structure discussed above by the interest profile builder (12).

As a further implementation of the invention, the content interest profile (18) may be enhanced based on information from social networks as follows. The consumer's social graph may be considered an audience for the targeting user and assessed in its entirety. In this case, the interest profile builder (12) in one implementation mines the profiles and publications of all of or a sample of a consumer's connections. To further develop the inference of the consumers' interests, the interest profile builder (12) may selectively mine the consumer's friend's relationships (e.g. friends in FACEBOOK™) for additional profile and publication content. For clarity, this implementation is not limited to friend relationships but may include other relationship types supported in the specific target entity (21) source platform, for example Companies the consumer is Following on LINKEDIN™ or company or brand pages the consumer Likes on FACEBOOK™. This content is then processed by the interest profile builder (12) to create the content consumer profile (18).

The interest profile builder (12) may additionally look for intersections among the users in this extended network and weight those intersected users as more important. For example, two of a consumer's followers may also be following Bill Gates, so Bill Gates' key phrase contribution would be more important in the inference. An additional modification would consider the percent of audience contribution. For example, since Bill Gates has over six million followers, the fact that two of my followers are following him is not that exceptional and therefore the weight would be reduced. A skilled reader will understand that various other weighting mechanisms may be used.

In another aspect of the invention, the interest profile builder (12) may in a further aspect of the invention record a consumer's interactions with associated content (for example, marking as favorite, liking or otherwise evaluating content, republishing content or otherwise sharing content). The members of a social graph that interact most with the consumer's content would be weighted as being more important. Additionally the content that is most favourably interacted with may be weighted higher in the key phrase extraction. This activity is most common with dynamic published content (posts or messages) but profiles and other static content may also be shared, viewed, rated, or favorited.

The interest profile builder (12) builds the content interest attributes (and stores them to the content interest profiles (18)) for the consumer (i) based on available information relevant to determine whether the particular consumer is likely to be interested in particular content (may be referred to as "target specific content interest attributes"), and also (ii) (for example where only partial target specific content interest attributes are available) may invoke the inference engine (20) to employ inference model (19) to predict the relevant content interest attributes for example relying on clustering groups of consumers based on "common interests", for example by mapping a particular consumer to the clustered groups of consumers (in one implementation by operation of the inference engine (20), for example by applying a similarity function (or other suitable operation) to match the particular consumer to one or more clustered groups whose "common interest" is most relevant based on the particular consumer based on the available target specific content interest attributes. In one implementation, clustered groups may be associated with associated content interest attributes that may be referred to as "relevant audience based content interest attributes".

The platform is optionally operable to push content to the particular consumer based on relevant audience based content interest attributes (22).

Also, in another aspect of the invention, the content interest profile builder includes or links to a learning utility (26) that is operable to embody one or more machine learning operations for enhancing the content interest attributes over time on an ongoing basis, based on further inferences regarding the consumer. As explained below, these inferences may be made including based on analysis of the consumption of content by the consumer.

The learning utility (26) may for example implement one or algorithms designed for improvement of the matching functionality described.

The system can also establish content interest profiles (18) iteratively, based on feedback from targeting users. In one aspect of the invention the platform (10) implements one or more mechanisms to capture information regarding interactions between consumers and content with which they are targeted.

As shown in FIG. 2, in one implementation the tracking utility (29) records information about the consumption event (e.g. device used, location) which the learning utility (26) may use to update the content interest profile (18) of the consumer for example if the learning utility (26) detects that the consumer is in a new location, it may recommend the user share content relevant to that location. In another example, the learning utility (29) may detect a change in the device used to consume the content and add this interest to the consumer's profile such that the platform (10) will prioritize new content matches related to the new device, further the platform (10) may update the matching profile to prefer content entities in the collection that are optimized for the new device. In one implementation of the invention, changes in the consumer's interest profile for example as identified through the preceding mechanisms, may trigger an event in the platform (10) for example to change to the consumer priority in the target manager (36), to notify the user of the change through the messaging utility (34) or create new events for user action in the content targeting utility (30).

The learning utility (26) may employ many techniques to monitor and measure communication campaigns. Every content communication should track the consumer's behaviour as extensively as possible. Since the platforms used in communicating the content may vary in capability, not all metrics can be measured for every user. The core metrics may include:

Delivery rates—how many communications are returned undelivered (e.g. email does not bounce back)?

Open rates—how many communications are viewed (e.g. email is opened)?

Content Click-Through Rates (CTR)—how often do consumers click on the content links?

Response Rates—how often do consumers click on Call to Actions within the content frame (e.g. visit a website, leave a comment, or send an email)?

Share Rates—how often does the consumer redistribute the content?

Unique Visits and Visitors (General Web Analytics)—how often does the user view the content? How many other users view the content?

These metrics will be reported to individual and aggregate users to monitor the success of their distribution activities. These metrics will also be used by the learning utility (26) to refine the matching algorithm by identifying shared attributes of successful content (sources, key phrases used, type of media, etc.). The refinements may be at to the individual, group or global model for either the consumer (e.g. Mike likes to share video content, sales people like to send short articles) or the consumer (e.g. Wayne likes to read articles from Mashable.com, Chief Technology Officers consume content relevant to their current company).

In the case where the consumer is common to many targeting users, the system may present data from that consumer's interaction in the entirety of the system. Additionally, the system may notify targeting users if the content has already been communicated to the consumer.

It is important to note that the learning utility (26) will also monitor the interactions both of the targeting user and consumer with the computer system of the present invention to derive user specific and global model enhancements. Interactions include but are not limited to:

Direct feedback on the content presented through rating mechanisms;

Click through rates on the content links presented;

Interactions (comments, shares, messages sent to author or subject) with the content;

Repeat consumption events;

Consumption of additional content within the domain;

Time spent consuming the content; and

Sharing of content provided (by monitoring proprietary link requests).

The learning utility (26) may also have access to the user's relationship management and communication platforms, for example through an API (27), to monitor the change in relationship strength as a result of the targeting user's actions on the platform. Measures of relationship strength include but are not limited to:
  Communication volume;
  Communication sentiment (positive, negative, neutral);
  Sales or Book Value (e.g. assets under management);
  Pipeline value;
  Number and Quality of Referrals; and
  Consumer satisfaction survey results (e.g. willingness to recommend)

The content interest profile builder (12) also enables targeting users to supplement content interest profiles with their own information and insight regarding consumers, thus enriching the content interest profile with personal insight. Further details regarding this aspect are provided below.

Content Matching Utility

Second, the platform includes a content matching utility (14) that is operable to match content objects from one or more data sources to consumers based on the content interest attributes, thereby generating from a domain of machine readable content ("entities") a subset of entities that are likely to be of interest to a consumer ("matched entities").

In one aspect, the content matching utility (14) is operable to dynamically construct for the consumer a "matching profile" (28) for optimizing the matching of available content objects to the current content interest profile (18) for the consumer. The matching profile (28) may be constructed based on a series of parameters including (i) one or more objectives used, selected (for example by a targeting user) or determined by the platform, for targeting the consumer with content, and (ii) the current content interest profile (18) for the consumer. The resulting profile specifies (i) time (the importance of age in the scoring model, filters on the allowable age of content), (ii) source (an authority rank for the scoring model or a filter on the sources or collections of content to consider), and (iii) matching key phrases (and relative weighting based on key phrase source).

The candidate entity collection (23) is indexed by the indexing utility (31) which are extracts and scores keywords and to create a searchable index stored in the content database (17). Factors that influence scoring may include:
  a) Placement inside document (for example using metadata, header, table of contents etc.)
  b) Age (Publication Date)
  c) Uniqueness
  d) Authority of the page or domain
  e) PageRank or similar web index value
  f) Popularity (number of views, number of shares, number of comments, retweets)
  g) Sentiment
  h) Other proprietary search result ranking methods
  i) Relevance Relevance encompasses topical and contextual relevance. Topical relevance assesses how well the candidate entity matches the specific topic areas of interest and how many of those topics are matched. Contextual relevance assesses the candidate entities context (geography, publication type, content classification) to the indented use. For example, an article about the business of travel photography would not be relevant to a personal relationship context. Relevance may also factor accuracy as measured by the confidence that the entity is a match for the interest.

The index may be further enhanced by semantic engine processing (24) to derive related concepts and categories and classify the context of the candidate entities in the content database (17). The content matching utility (14) can then intersect the matching profile (28) with the content database (17) to determine which content items are the most relevant to the consumer.

In one embodiment of the system, the content matching utility (14) enables matching of a user's content interest profile (18) against publicly available web content. This includes public domain news and business content generally available on the Internet. In a further embodiment, the system may rely on third party indexes and matching services like GOOGLE CUSTOM SEARCH ENGINE™ to access and partially match this content. Further details are provided in the use cases below.

It is also possible to predict content relevance by assessing the relevance and authority of the source of the content. Search engines routinely assess authority through mechanisms like PageRank™ but without bias towards a specific end use case—their goal is to be broadly relevant to any possible search and infer intent from the query structure. The content matching utility (14) can add a bias to specific sources by creating collections associated with one or more attributes of a particular content interest profile (18), for example associate authoritative sources with the industry "Marketing and Advertising" and prefer content matches from those sources in the case that the content interest attribute (22) current industry is "Marketing and Advertising". This bias will increase the efficiency in sourcing relevant content by more specifically targeting the search. These collections may be internal or external to the system. They may rely on $3^{rd}$ party authority (expert opinion), collective opinion (through direct or indirect feedback), or some combination of both. The content matching utility (14) will monitor and communicate the effectiveness of the sources in the collection by tracking the performance of the content through the learning utility (26)—items returned on search, items selected for display, items published, and feedback on items.

There a number of different ways the content matching utility (14) may be initiated. In one embodiment the targeting user will initiate 'ad hoc' matching directly through the content targeting utility (30). The matching may also be done on a scheduled basis (either by specific dates or times) or by setting frequencies (daily, hourly or real time). Matching may be set to run on specific triggers, for example: system scheduled events, interest profile changes, or interest profile events. Examples of system scheduled events include calendared meetings and time bound tasks. Examples of interest profile changes include a promotion to a new job notice on LinkedIn™ or a recent post to TWITTER™ or a received email or CRM profile update. Examples of interest profile events are birthdays, anniversaries, and graduation dates.

In one embodiment of the system, the content matching utility (14) accesses one or more private content repositories, for example those secured through user or network access controls which serves as the candidate entity collection (23). In this instance, the content matching utility (14) will be granted secure access to one or more content repositories or passed a secure connection to a search service that has access to the repository. This mode would be useful for sales and marketing organizations that have created proprietary content or licensed high value content. In this embodiment, the targeting user may be distributing a secured URL to the content or the electronic file itself. Access may be through a standardized API established for the secure content repositories.

For example, the content matching utility (14) enables the determination (based on user input from a consumer for example or derivation of context from other available information, for example semantic analysis of recent electronic correspondence between a targeting user and a consumer) of one or more categories used for weighting content objects in generating the matching entities. The weighting may be used to rank matched entities or filter content objects from the matched entities. The matching operations may also include for example one or more applicable interest and/or importance thresholds that are stored by the platform for the consumer.

The matching operations may also be dynamically updated based on logged interactions between the consumer and matched entities, as described below.

The tracking utility (29) monitors the interactions and feeds the activity to the learning utility (26) which then informs the matching operations by assigning "quality scores" to particular content objects in the content database (17), including such actions as consumption of content objects by other consumers, especially consumers similar to a particular consumer.

The learning utility (26) will also calculate an engagement score that may be used by the platform for example to present to the user through the content targeting utility (30) or to modify the "quality scores" in the content database or to modify the target priority in the target manager. In one implementation of the invention the engagement score is calculated based the number of consumption events by the targeted consumer, sometimes known as a read event, and the number of additional consumers that consumed the content, sometimes known as a share event.

It should be noted for clarity that the while the system is generally described as functioning where the specific target entity is a consumer and the candidate entity collection is a collection of content, it may be constituted using similar components to function in the other direction. That is where the specific target entity is a content item and the candidate entity collection is a collection of consumer profiles In one implementation of the invention for example, when a user has shared an article with a target consumer, the content matching utility will recommend additional consumers to share that article with either through matching the targeted consumer profile to the consumer profile collection or matching the article to the consumer profile collection.

The learning utility (26) then monitors the most engaged profiles and update the matching profile accordingly. This would have the effect for example of recommending to a user that engages successfully with patent lawyers in their immediate (1st degree) network, additional patent lawyers in their extended network (2nd degree and beyond) or an independent profile repository (CRM or List Service) to engage with.

Content Targeting Utility

The platform also provides one or more tools that enable targeting users to define one or more parameters for targeting users, in addition to the content matching operations described above. The definition of these parameters may be used to dynamically update the relevant content interest profiles.

These tools may be accessed through a content targeting utility (30) which may be linked to a dashboard (32) for accessing various functions for targeting consumers using content. The targeting user uses the dashboard (32) to manage information for their consumers.

The dashboard (32) may be incorporated for example into a CRM platform or portal or similar technology platform.

The platform therefore enables the targeting users to build and manage contact lists for the purpose of managing their relationships with consumers. The platform enables targeting users to push content to their contacts on a "just in time" basis that has a significant degree of likelihood of being of interest to the consumer. It is useful to consider the use cases set out below.

In one aspect of the invention, a skilled reader will understand that the platform is "goal-oriented" and therefore incorporates or links to a series of different tools or operations that enables targeting users to create and manage campaigns that involve consumers, including content likely to be of interest to the consumers.

The content targeting utility (30) may for example provide the following functionality:

(A) enable targeting users to review and access available current information (from one or more data sources, including publicly available information and optionally proprietary databases or databases linked to the platform such as CRM databases) regarding one or more consumers, based for example on social media analytics or automated Internet searches so as to identify for example (i) news, events or content directly related to the consumer (such as an event in which the consumer has participated, new content created by the consumer, or content related to the consumer's company or other specific relationship), or (ii) news, events or content likely to be of interest to the consumer (by invoking the current content interest profile).

(B) The targeting user may have new information relevant to one or more consumers that may not be contained in the available current information. The targeting user may update the relevant content interest profiles (18) manually using their dashboard (32), in order to reflect this information which may include private information such as information that has not yet become publicly available. (C) The targeting user may review (A) and/or (B) and either provide input that triggers an update of the matching operations, or modify the content objects to be provided to the consumer for example by deselecting matched entities or for example adding other content objects that may be available through the dashboard (32) that may not have been identified as matched entities based on the matching operations (for example a content object may not be a platform generated matched entity because it did not rank highly enough based on the matching operations, however, based on information of the targeting user, the targeting user may incorporate this content object in the set of content objects to be made available to the consumer).

The content targeting utility (30) may be implemented as a workspace or interface in which the targeting user will identify consumers and audiences, execute content searches and matches, and interact with the inputs and outputs.

In one implementation, the content targeting utility (30) may be a stand-alone web interface, however other modes are considered. However, various other implementations are also possible. For example, the content targeting utility (30) may be incorporated into an email client, as part of a web mail solution for example, or an installed a web or installed plugin. An email console incorporating or linking to the functionality of the present invention may be used for example to: (A) select the targets, (B) augment profiles with email communication, (C) present the search results, and (D) publish the results. The incorporation could be further extended to include calendaring integration, allowing the system to act on the targeting user's schedule for example to initiate content searches based on the attendees of a scheduled meeting.

In one embodiment of the content targeting utility (30), the targeting user will access a landing page after logging in. The page will house a number of different content containers. The containers will be moveable on the page and can be positioned, sized, or suppressed by the targeting user according to their preference (i.e. similar to an iGoogle widgetized page). The basic configuration will only consist of two containers—a personally relevant content container and a consumer relevant content container. Additional containers may include summary analytics reports, open notifications (letting the user know which targets have viewed content and which haven't) and alerts to notify the user of new found content for any targets that the user has placed on a "watch list".

The personally relevant content container may display a listing of content that the content matching utility (14) has identified as being relevant to the targeting user based on their own content interest profile (18). The consumer relevant content container displays results of the content matching utility (14) for consumers identified by the targeting user. This container will be a summary view similar to a search engine result page or excerpt of an inbox.

The content targeting utility (30) may also contain a profile identity selection display where users are presented with the profile identities in their registered networks, for example $1^{st}$ degree connections from LinkedIn™, Friends in FACEBOOK™, Followers in TWITTER™, or contacts in their SALESFORCE.COM™ profile. FIG. 4 illustrates a representative implementation of the present invention, showing integration with SALESFORCE.COM™.

The targeting user may also update the specific target entity through the content targeting utility (30) by relating additional online sources (25). For example, this could include specific documents (e.g. emails, articles, videos) or additional document collections by way of an identity, for example a social media profile (collection of documents associated with the profile), or email address (collection of emails involving that address). A specific example of this operation would be to select a LinkedIn connection and then search and associate a Twitter account. The interest profile builder (18) would then combine insights from both social media accounts.

Targeting users can browse, filter or search this list for profile identities to add to their consumer list. Targeting users can also search beyond their immediate connections using a simple one field search, or a more granular multi-field search and return profiles according to the privileges of the targeting user's account on the registered network. Users can then add profile identities from these search results to their consumer contact list as new consumers or additions to existing consumer contacts.

In one embodiment of the system, a completeness assessment is performed on the consumer contacts to calculate a numerical ranking of the quality of the content interest profile builder output. This analysis represents how likely the content matching utility is to find relevant results and indicates to targeting users which consumers are the best candidates for content matching and which require supplemental or markup data.

Supplemental or markup data refers to sources of information and intelligence available to the targeting user about the consumer's interests that is beyond the capability of the system to mine for example unrecorded conversations or $3^{rd}$ party information. This information may be entered by the targeting user through form fields, uploaded as a file, or identified by URL. The user may have the option of indicating a relative importance (weight) to each of the additional data.

Targeting users may also review the results of the content interest profile builder (12) through the profile review display to better understand the recommendations generated by the system. Targeting users will also be able to modify the content interest profiles (18) by supplementing them, removing items, changing the weighting or priority of the component profile items or setting negative conditions (e.g. keywords or phrases to avoid). The profile review display may employ various visualization mechanisms, for example keyword weightings and density can be displayed as a tag cloud or wordle or similar approach where the scalar dimensions are represented by the size or colour of the font. These visualizations may also be exported as an HTML snippet, an image, or an animation, for example to include in a social media profile or email signature. Additional information that may be added to the visualization may include changes in the interest profile over time like in a stream graph. User will be able to access historical interest profiles by clicking on points in time in the timeline graph. The visualization may also integrate data from other interest profiles aggregated across the application and from the User specifically. Filters and other data manipulation devices may be used to control the visualization. Charts and other standard data display mechanisms may also be used.

Figure 3:
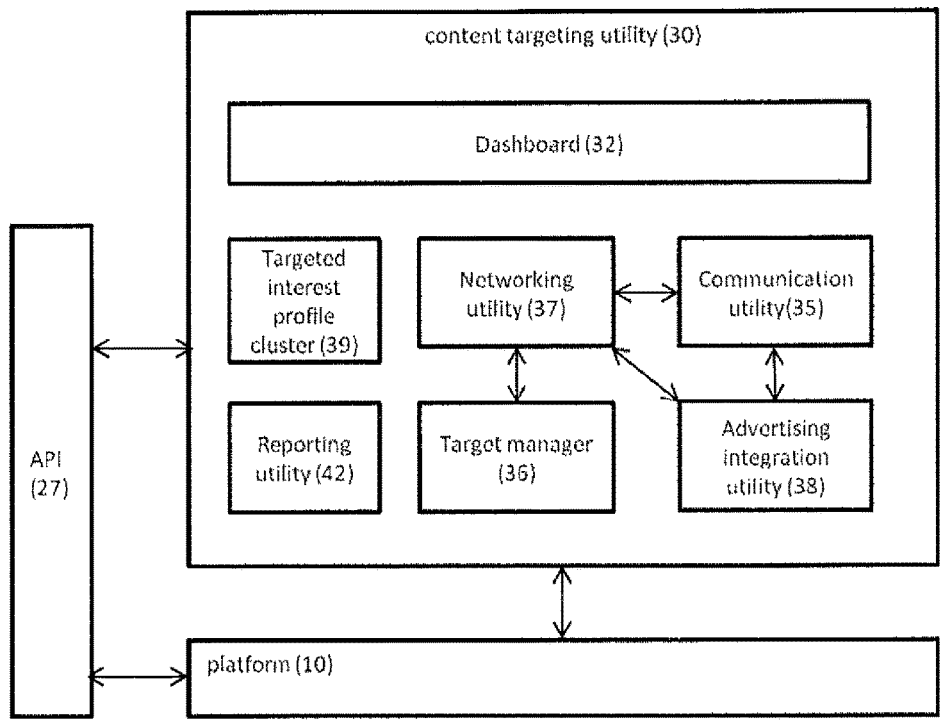
FIG. 3 illustrates the computer system, in one embodiment thereof, is a further schematic diagram depicting a possible implementation of the computer system of the present invention.

In one implementation the platform (10) uses the content interest profile (18) to build a communication template personalized to the consumer by invoking a communication utility (35) otherwise known as a mail builder or email builder, as shown in FIG. 3. The communication utility (35) automatically selects the copy (message content) and style template that reflect the dimensions of the content interest profile specific to the content shared, as well as the context of the communication (e.g. professional, personal, formal) based on the nature of the relationship and the content interest attributes (22) of the interest profile (18) used to match the content. For example, if the targeting user is sharing a recent article that matches a personal interest (SKIING in ONTARIO), the tone of the template could be personal and the copy can reflect (for example based on modulation thereof) the interest profile ("I know you enjoy skiing in Ontario so I thought you'd enjoy this article."). The communication utility (35) may record the templates used in the communication to optionally use the same settings in future communications with the targeted consumer or generally to consumers or to vary the content of the message so that the consumer does not recognize the communication as being templated. The communication utility (35) may also dynamically select alternate templates with respect to content, style, and message format based on specific content interest attributes for example location, language, preferred consumption device. For further clarity, if a consumer was known by the platform (10) to consume content primarily using a smartphone, the communication utility (35) may preferentially select a message display layout optimized for smartphones and a brief message for easier consumption.

The communication utility (35) can include an user interface component that allows the user to further customize the communication by selecting alternate templates and creating their own templates. The user may also configure the system to default specific templates generally or in specific scenarios or for specific targets or target groups. The communication utility (35) operates such that a user is presented with a complete communication, including but not limited to: recipient, subject, salutation, body (including content reference), and signature. In this way the user is able to send the message with very little interaction, in particular this eliminates the need to access the keyboard on a smartphone which is a significant usability issue. The communication utility (35) optionally includes an editor to allow the user to further personalize the message. The communication utility (35) optionally provides distribution options to the user for example different mail services or communication platforms. The user may elect to send a specific communication through email and another through a direct message on Twitter. The platform connects to the external communication platforms through an API (27) to deliver the messages.

The communication utility (35) may further include a multitude of communication modes. The utility may function in direct mode as previously discussed where there is a single target consumer. The utility may also function in broadcast or group communication modes. In broadcast, the user is no longer sending a communication to a discrete target. The source of the matching profile may be a specific target consumer, target consumer cluster, or the user's interest profile among others, the difference is the mode of distribution. Broadcast mode differs from direct communication in that the templates provided by the utility as well as the distribution options available to the user. Examples of distribution options in this mode include but are not limited to posting an activity update to LinkedIn or posting a tweet on Twitter.

In a group communication mode the user may be targeting a cluster of consumers or may elect to choose that cluster as the recipient or may construct that cluster manually by selecting a multitude of recipients through the communication utility (35) interface. The group communication mode may optionally send one communication to a number of people or automatically generate one personalized individual message for each recipient. This may be implemented for example through a process that automatically generates a unique email for each recipient that customizes the To field, the salutation in the message, the reference to the interest profile (matching keywords) in the message, and the URL reference to the content in the message (to allow individual tracking). It should be noted that the user may be presented with the option to add their own independent content item or reference for distribution. If the platform has access to the desired mail server, this series of email messages may be sent automatically by the platform through the API (27).

In another aspect of the invention, it is beneficial to the user to for the platform to recommend additional or alternate targets. These cases include but are not limited to the user chooses to send an article they've already sent to a specific target or when the user selects an article. The platform may provide recommendations by matching the target interest profile to a collection of consumer profiles or by matching the target content item to a collection of consumer interest profiles.

Another aspect of the Content Targeting Utility (30) is the target manager (36), shown in FIG. 3. The target manager (36) is responsible for tracking interaction of the platform and user with target entities. In one implementation of the invention, targets can be prioritized by users through the interface either individually (set a priority for a specific contact) or as a collection (set a priority for all contacts at company X). Targets may also be prioritized by the platform by monitoring user behaviour for example when the user shares content with a target, the target manager (36) may raise the priority of that target. For example, the target manager (36) may initiate a target matching for a consumer target based on the length of time between communications. The target manager (36) may also function periodically to select a group of target entities for matching. The target manager (36) may notify the user of the top matches by way of the messaging utility (34) (shown in FIG. 2). The notification may be an external communication for example an email. The user would then be able to select which matches to act on. This process may also function autonomously in that user intervention would not be required to send the communications to the targets. The target manager (36) may provide further functionality (which may be implemented using a suitable algorithm) to intelligently select the group of target entities as a function of platform and user activity. Factors in the selection algorithm include but are not limited to recent frequency of selection, last selection date, last share date, target priority, relationship type.

In one aspect of the invention, the platform may be used to identify and facilitate referrals and introductions to new target consumers so the user can grow their networks. The networking utility (37) interacts with the target manager (36) to identify and cluster the target consumers the user is most engaged with. The networking utility (37) then employs the content interest profile builder (12) to identify clusters of content interest attributes (22). The user can modify these clusters through the user interface for example by specifying a specific set of target industries. In one implementation of the platform, the user specifies the content interest attributes (22) that s/he is targeting, as part of a wizard for example or a input menu. An example in a professional context would be a user targeting executives in small to medium size companies in the marketing and advertising industry in Toronto. To extend the example, the user may share content with executives in the technology industry in Toronto which is then tracked by the target manager (36). The networking utility (37) may extract and aggregates the data in the target manager (36) to identify the new targeted interest cluster.

The networking utility (37) may be initiated by a scheduler or related process, as a result of an internal or external trigger or user action. The networking utility (37), in one implementation, functions by initiating a matching operation between the targeted profile cluster and a collection of consumer profiles. In one implementation of the system, the collection of consumer profiles may be all second-degree connections on LinkedIn. Other implementations include but are not limited to a collection of profiles in an online repository such as Work.com™, an internal collection of profiles of other users, or a collection residing in a proprietary CRM system.

In one implementation of the invention, the networking utility (37) presents candidate introductions in the content targeting utility interface. The user can then accept or decline the introductions. The platform will then identify any known or likely shared connections or introduction paths for the user. If the user selects an introduction path, the communication utility (35) loads introduction request templates for the user to send. The user may alternatively choose to contact the introducer in advance of the introduction request. In this case the platform will perform a matching operation to identify relevant content to engage the introducer. The platform will then create a follow up event (either timed or event-driven) to prompt the user to request the introduction from the introducer. Once the introduction is requested, the platform creates a further follow up event that will prompt the user to communicate with the introducer again. As part of this follow up the platform may perform a matching that operates to identify content relevant to the candidate consumer and request the content be forwarded by the introducer. At any point the user may change the introducer or attempt to connect with the candidate consumer.

An additional aspect of the invention is an optional advertising integration utility (38), also shown in FIG. 3, which enables the platform to communicate with platforms where the recipients are unknown to the user, for example search engine marketing and digital display advertising. The networking utility (37) performs an outbound marketing function on the users identified target interest clusters but there can also be an inbound marketing function. Digital advertising and in particular social media advertising may be highly targeted based on a rich collection expressed and inferred audience characteristics and meta-data. The advertising integration utility (38) functions to translate the targeted interest profile clusters into audience targeting criteria as required by the media networks and social media platforms. For example, a user may be targeting marketing executives in Toronto, and the advertising integration utility (38) translates those interests for example to buy advertising on LinkedIn in connection with a o a campaign targeting criteria Role=Senior Executive, Location=Toronto Area, Canada and Industry=Marketing and Advertising. The advertising integration utility (38) can have a user r interface component that allows the user to configure campaign details (art, copy, duration, budget) to initiate the campaign. These campaign settings may be set globally or in templates for different campaigns. In one implementation the communication utility (35) presents ad templates for the user to select or configure. The advertising may also optionally include content as matched by the matching utility to the targeted profile interest cluster. In the preferred implementation, the advertising integration utility (38) communicates all of the specifications for a campaign through an API to the advertising platform (e.g. Facebook Ads, Google Adwords, LinkedIn Ads). In one implementation of the invention, the advertising integration utility (38) will interact with the communication utility (35) to enable communications sent in broadcast mode to be promoted through a 'sponsored post' mechanism thereby increasing the potential audience for the post.

In one implementation, measures are calculated by an analytics engine (40) (shown in FIG. 2) and communicated to the user by a reporting utility (42) for example through a user interface. The measures may include the value of specific interactions, specific consumer relationships, consumer group relationships, the user's effectiveness in managing relationships, and the effectiveness of a group of users for example a sales department. For further clarity, examples of specific measures include but are not limited to: 1) measuring the user's diligence/efforts to engage consumers 2) measuring the consumers' response to the user's efforts to engage and 3) the overall satisfaction of consumers with respect to the relevance of the content, where: pv: is a profile view instance executed by user (matching event), r: is a read instance by a consumer (consumption event), s: is a share instance executed by a user (communication event), N(s): total number of shares executed by user, N(r): total number of reads executed by consumers in response to those shares, cap(r) is the number of read instances counted against a share up to a maximum value ("cap")_, in the following measures:

1) User's Engagement Effort Factor=N(s)/N(pv)
2.1) Effective Consumer Response Rate=(for r=1 to N(s): sum[cap(r)])/N(s)*3
2.2) Net Consumer Response Factor=N(r)/N(pv)
3.1) Raw System Relevance Score=N(r)/N(s)
3.2) Effective Overall Relevance Score=(for r=1 to N(s): sum[cap(r)])/N(s)

Use Case 1—Social Media Integration

A use case is provided that illustrates particular functions of specific implementations of the invention.

Jack wants to send content that is really relevant to Jill at the moment. Jack is a sales professional with a marketing software company. Jill is a market director at a consumer goods company. Jack and Jill both have a cottage. Jill is a user of TWITTER™ and LinkedIn™. She has recently purchased an iPhone™ and is interested in the latest iPhone™ applications.

Jack is a user of the platform of the present invention, and accesses the dashboard for the content targeting utility. Jack may begin by providing some information identifying Jill, such as one of her email addresses. The platform determines whether a content interest profile exists for Jill within Jack's account, meaning a profile for Jill, run for Jack ("Jill's profile), as in one aspect of the platform profiles are specific to the individual, and also the individual for whom they were created.

If no profile exists for Jill, the API searches for possible matches on public platforms such as LinkedIn™ and TWITTER™. It may also extend to personal networks like FACEBOOK™ depending on the nature of the relationship and the privacy restrictions on data. Resulting information is presented to Jack and Jack selects one or more results so as to confirm that they correspond to Jill.

The platform analyzes how complete Jill's profile is. The completeness of the profile may depend for example on how complete her career details are in LinkedIn™ or how active Jill is on TWITTER™ or comparable social media platforms.

Optionally, the platform generates one or more suggestions for Jack completing Jill's profile. Jack may already have some of this information.

In another aspect, the dashboard enables Jack to provide information regarding why he is targeting Jill, and this information may be used by the platform to assess the completeness of Jill's profile.

The profile builder analyzes the data collected and determines Jill's interests (content interest attributes) and the associated relative importance scores. The content interest attributes may consist of for example "MARKETING 80%", "ADVERTISING 76%", "SOCIAL MEDIA 66%", "MOBILE 50%", "CONSUMER PACKAGE GOODS BEST PRACTICES 38%".

The profile builder accesses the available information, extracts the content interest attributes and calculates the relative importance scores based on the information available.

Alternatively, if Jill's profile already exists on the platform in Jack's account, the platform may update Jill's profile for example based on recent social media activities. For example, Jill may have recently tweeted about new iPhone™ applications she's installed and is using on her new phone, which would add a keyword to the content interest profile attributes "IPHONE APPS 75%". The rating is high because the posts are current and therefore highly relevant right now to Jill.

The dashboard may display the interests and associated relative importance scores. Jack may be invited by the dashboard to supplement the interests based on his personal knowledge of Jill. Jack may add "COTTAGE" as an additional interest for Jill. The platform may determine a score, based on how common this term is and therefore how specific it is for her. Additionally, Jack may assign a weight based on one or more criteria presented to Jack by the platform such as "very important" or "somewhat important". This assigned weight may translate to a relative score, for example "COTTAGE 80%".

In one aspect, Jack's input may be weighted as a source of information concerning Jill, just as any other source.

The inference engine can now be triggered. The inference engine analyzes the current list of interests and associated relative importance scores and attempt to find new key words for Jill. The inference engine for example analyzes the profiles of other individuals who have a similar job titles to determine the job related interests that have been defined for them by the platform. For example, Jill may not have used the term "BRAND MANAGEMENT" in her LinkedIn™ profile, however, other individuals with similar job titles may have used this term.

The profile builder then provides a relative importance score for "BRAND MANAGEMENT" (and possibly other supplemental content interest attributes generated by the platform) based on the strength of the correlation between the existing content interest attributes and any inferred content interest attributes. For example, if "BRAND MANAGEMENT" maps closely to "ADVERTISING", it may receive a similar relative importance score.

Jill's profile may include personal profile elements that are personal to her, and also group profile elements that we have a profile for Jill. The platform, in one aspect, determines for example which of the profile elements are shared with other users who have similar job titles for example.

In one aspect, content is indexed by the platform, or in some cases trusted content is not indexed but may be associated in the platform with a particular domain. If content is indexed, this may involve determining a set of keywords that determine categories and concepts associated with content in the database associated with the platform. The keywords may be semantically enhanced. The resulting categories may be organized in an index tree.

The platform uses the profile to map Jill to one or more groups based on group profile elements. The platform finds relevant content in part by mapping Jill based on her group profile elements to the indexed content.

Jill's Profile is in the structured format previously described. Jill's profile is updated by the platform based on extraction of new information about Jill, for example from changes to her LinkedIn™ information, new tweets, or her other social media interactions.

The platform runs a search for content relevant to Jill at this time. In one aspect, the platform runs a series of searches. The particular parameters of these searches may depend on settings set by Jack, and optionally by Jack for Jill. Typically, however, the default settings for the platform are such that content that maps to a shared interest of Jack and Jill is assumed to be of interest to Jack in targeting Jill using the platform. Therefore the platform runs a search of content based on both Jack's profile and Jill's profile.

The results are ranked based on the proprietary methods embodied in the platform. The platform ranks results based on how well any categories associated with indexed content matches their respective profiles.

The platform may return for example 5 results for review by Jack. Jack may request the display of additional results. Also, Jack may review the results and provide further information regarding content likely to be of interest to Jill, which may result in an update to Jill's profile and a new search.

The platform may return for example: (A) an article about a new iPhone™ application for use in cottage country, and (B) an article about a new mobile application published by a consumer packaged goods company for marketing purposes. These articles are likely to be seen by Jill as being very relevant, and prior art platforms would not have identified Jill's interests in such a granular way, with little work required by Jack, and furthermore prior art platforms would likely not have been able to match content as closely to Jill's profile as the platform.

Significantly, matched article (A) reflects a shared interest of Jack and Jill, namely cottages. Content that reflects a shared interest builds on personal affinity and therefore is highly valued by Jack in building a relationship with Jill from a targeting perspective.

The platform delivers the content to Jill and also measures that Jill may have read article (A) but not article (B). This information may be used to recalibrate Jill's profile to improve targeting next time. For example, a greater relative importance score may be assigned to the related keywords in Jill's profile, for example "COTTAGE" and "IPHONE APPS".

Use Case 2—CRM Integration

Jack is a sales professional for a marketing technology company. As part of his sales cycle he manages relationships with a number of client stakeholders, including decision-makers, gatekeepers, and influencers. Jack had the opportunity to meet a key influencer one of his prospective clients, Proctor and Gamble. Jack was at a Social Media Technology conference where he met John, a Director in IT at Proctor and Gamble. Jack wants to maintain an open line of communication with John to maintain a positive impression, gain trust, and identify any issues with the sale.

In one aspect of the invention, the platform may be integrated with a Customer Relationship Management (CRM) system for example SALESFORCE.COM™. Jack is prompted by his CRM system to contact John based on the reminder he set to follow up on their initial meeting at the tradeshow.

Jack may access the dashboard for the content targeting utility through his CRM. In one aspect, John's profile in the platform would be linked to the contact record for John in the CRM and Jack could access John's content interest profile directly from the CRM reminder.

The profile builder analyzes the target entity data for John from the CRM through an API, accessing for example contact notes. In one aspect of the platform the profile builder can also read John's associated online identities from CRM contact records and access those systems to analyze profile data. Optionally, Jack may search through the platform's API connection to external social platforms for John's profiles.

The platform's profile builder extracts relevant keywords and calculates profile completeness. The profile builder extracts a collection of keywords with relative weighting. It is important to note that the CRM data would be used by the platform to build the content interest profile, for example adding "SOCIAL MEDIA TECHNOLOGY 80%" to the profile because it appears in the CRM contact notes in the description of the event.

The platform displays John's interest profile to Jack through the dashboard. This step is unique as current technology simply aggregates a display of all known sources of contact data (email history, CRM contact record, social media profiles, etc.) but does not analyze that data to produce a simple, semantic representation of the contact and the relationship for the user. Currently the user must review all of the available data to get a picture of the contact's interests and most relevant information. The insights generated by the profile builder are much more efficient to consume and direct further information review. Extracting thematic meaning from this collection unstructured content is a time consuming and technically challenging task for a person.

The profile builder calls the inference engine to enhance the profile with relevant topics, categories, and related entities, including adding a competitor entity "UNI-LEVER". This is a unique aspect of the invention that extends the summarizing capability of the profile builder to introduce meaning and structure to the keywords. This is important because it translates the literal text from the target entity sources into meaningful concepts and categories that may not be readily apparent, especially if there is substantial use of industry jargon and technical terms.

The dashboard displays John's interest profile and gives Jack the option to adjust the weighting of the keywords. Jack increases the importance of "SOCIAL MEDIA TECHNOLOGY" to 100% since this is the topic of a shared experience and would be an ideal starting point for engagement.

The content matching utility searches the content database to match content on the keywords in John's profile and discovers an article on Unilever™'s announcement that they are deploying the social enterprise technology Jive™. This announcement appears in several publications but the Learning Engine has ranked informationweek.com as the most authoritative source due to the high response rates of links distributed.

Other search engines rank content sources based on a multitude of factors that seek to assess general authority. In this case the ranking is tuned to maximize the likelihood of the consumer reading the content by combining non-obvious and effective keywords with highly effective content sources.

Jack sends a link to the article by email to John with a message to stay in touch.

The platform records John's actions when he opens the email and clicks on the link and reports the actions back to Jack through the dashboard and updates the content database by way of the Learning Engine, increasing the rank of informationweek.com globally for related group profiles and specifically for John's profile.

Use Case 3—New Connection Discovery

Jack is a sales professional for a marketing technology company. As part of his sales cycle he manages relationships with a number of client stakeholders, including decision-makers, gatekeepers, and influencers. Jack uses a CRM (Salesforce.com) to manage his sales pipeline and existing client list and LinkedIn to maintain his broader network connections.

In one aspect of the invention, the platform connects to Jack's account in salesforce.com and his account in LinkedIn. The platform analyzes Jack's CRM contacts and clients and his LinkedIn connections to construct a collection of common interest profile attributes and their relative importance to Jack, and clusters them into target profile clusters. The platform then presents these to Jack though the dashboard for Jack's input to configure the attributes in the profiles and the relative importance of the profiles. In this example Jack's highest priority relationships are with senior technology executives with marketing interests in the retail and consumer products industries.

The platform periodically runs a matching process between the target profile clusters and Jack's 2nd degree network on LinkedIn (connections of connections) and notifies Jack when highly relevant matches are made. In this case the platform identifies Wayne, a VP of technology at a startup marketing software company in Jack's 2nd degree network, as a highly relevant match to Jack's targeted profile cluster. Jack is interested in networking with Wayne by getting introduced to him through a shared connection and chooses to activate the referral in the platform.

The platform further investigates the shared connections to assess which connection would be the best to ask for the referral. The platform recommends Jonathan as a shared connection that could introduce Jack to Wayne. Jack selects Jonathan and the platform presents the mail builder with an introduction template. Jack has the option of connecting directly with Wayne through a LinkedIn invitation to connect if he knows Wayne already. Jack chooses to ask Jonathan for an introduction to Wayne. If Jack hasn't spoken to Jonathan in a while, the platform provides the option to get back in touch by sending Jonathan an email with relevant content using the consumer targeting function. If Jack elects to get back in touch, the platform will create a reminder event to request the introduction at a later date. This event may be triggered when Jonathan reads the email sent.

If Jack has a current relationship with Jonathan, he may also request the introduction immediately. Jack can choose from a collection of templates in the mail builder. Jack can also choose to find an article relevant for Wayne to send to Jonathan. Jack chooses to request the introduction without an article. The platform will then monitor the user's network to identify when to Wayne becomes a connection. After a week Wayne and Jack are still not connected, the platform will prompt Jack with a follow up event. Jack chooses to follow up on the introduction request and the platform initiates an article search for the target consumer (Wayne). Jack selects a relevant article for Wayne and the mail builder populates a message with a follow up template requesting Jonathan forward the article to Wayne. Jack can then send the message to Jonathan.

When Wayne connects with Jack by responding to his message, or in LinkedIn accepts an invitation to connect, the platform records the success connection. The platform notifies Jack of the successful introduction and sets a priority on the new connection and the introducer.

Method

In another aspect of the present invention, a method is provided for targeting one or more consumers with content likely to be of interest to the consumers comprising:

(A) identifying one or more consumers;

(B) using a content interest builder to access one or more data sources and build a base profile for each consumer;

(C) optionally providing a tool for one or more targeting users to supplement the base profiles;

(D) dynamically analyzing one or more data sources to update the base profile for each consumer;

(F) (i) optionally clustering consumers to identify clusters of consumers with a "common interest" and determining a collective "common interest profile" for each cluster of consumers; and (ii) mapping each consumer to one or more clusters of consumers based on similarity of content interests, analyzing the current state of each content interest profile to determine whether the content interest profile may benefit from enhancing the content interest profile based on information available from the mapped one or more collective "common interest" profiles, and if so updating the consumer's content interest profile based on information from the mapped collective "common interest profiles".

(F) dynamically generating a matching profile for matching available content objects to one or more consumers based on their current content interest profiles and one or more other matching parameters;

(G) generating from the content objects a set of matched entities;

(H) optionally displaying the matched entities to a targeting user for enabling the targeting user to initiate further filtering and/or matching operations, thereby optionally generating an updated set of matching entities; and (I) optionally making the matched entities available to the consumer, the matched entities having a substantial likelihood of being of interest to the consumer at the time they are made available to the consumer.

In one embodiment, the system may monitor one or more specific content sources for new published materials. New content would be identified by the system, either actively by receiving a notice from the publisher or passively by monitoring a service like an RSS feed. The system could then analyze the content for the best matching profiles and notify the users monitoring those profiles. This mode of operating places a greater priority on the content than the timing of the user and functions more like an alert service.

In another aspect of the present invention the content targeting utility (30) may include or link to a messaging utility (34). The messaging utility (34) may enable for example autonomous operation of the utility, namely outbound messaging may be triggered automatically when content above a relevancy point is found. This effectively allows the user to stay on top of content that is relevant to that particular high value prospect. The system can also be configured to broadcast a stream of relevant content to the prospect (and of course add personal messages with each broadcast).

In the preferred operation of the system, the content targeting utility (30) enables the distribution of content in a manner controlled by the system. For open platform distribution mechanisms (email, social media) this can be through the distribution of consumer-specific or content-specific system generated URLs or content streams.

In one implementation, the content targeting utility (30) may present the source or original content in a system-generated frame or wrapper. The wrapper may contain personalized or promotional content that the targeting user may control for example to add a message, company logo or other promotional elements. It is possible that source content may also be extracted or scraped for improved presentation particularly for mobile device users. The experience may be similar to a web reader or aggregator, where the user can browse a grid of content snippets or a list of content items. Selecting an item will display as much content as is possible based on use rights. In some cases this may be a long synopsis (similar to an RSS feed), whereas other licensed content would be displayed in full.

A skilled reader will also understand that the content targeting utility (30) may also incorporate features common in electronic and web-based readers, including: new content notification, read article tracking, favorites, highlighting, commenting, and social media sharing. The targeting user may be given some control over the interface (layout, fonts, colours) and content sequencing (sorting, filtering). The mobile web interface may also follow responsive web design principles to adapt the layout of the page to the mobile form factor and hardware capability.

In a particular implementation, the mobile web interface functions as platform for two-way communication between the targeting user and the consumer. This would have many of the features as social media forums or comments on blogs to support a discussion of the content presented or originate a new discussion. Personalizing the content experience through a native application would provide similar functionality to use of the mobile web except delivered through a different application platform. The native app approach could feature additional feature sets not available through the mobile web, such as large data storage for offline access, Examples of Implementation What follows are particular examples of how the platform (10) and computer implemented methods described above may be configured or used. A skilled reader will appreciate that the invention may be adapted to support or integrate with various other applications that relate to content discovery or content based marketing.

Content Discovery

In one implementation of the present invention, the platform (10) may be used to search for new, relevant content, which is referred to in this disclosure as a discovery mode implementation of the invention. A skilled reader will also appreciate that this aspect of the invention may also be referred to as a search mode or search implementation of the present invention.

In one implementation of the invention, there are two different aspects of the discovery implementation of the invention, (A) an active discovery mode, and (B) a passive discover mode. (A) Active discovery mode may involve a directed action by the user to seek content for a specific purpose. (B) Passive search involves searching for content without a specific intent.

In one implementation of the platform (10), the server (11) may link through the API (27) to one or more third party platforms in order to provide enhanced content search or content discovery functionality. For example, the API (27) may be configured to integrate with LinkedIn™, FACEBOOK™, YAHOO TERM EXTRACTION WEB SERVICE™, or the GOOGLE CUSTOM SEARCH ENGINE™ service.

Active Content Discovery

What follows is a possible implementation of the platform (10) and related computer implemented methods, relating to active content discovery. The example provided below relates to a possible implementation of the invention that is integrated with LinkedIn™. The features explained below are only representative of possible functions and features that may be included in the platform (10). A skilled reader will understand that the platform (10) may be integrated with numerous other platforms.

A user may launch the content targeting utility (30) using a web browser loaded on the user's network-connected device. A content targeting dashboard (32) may be linked to the content targeting utility (30) which may include a series of screen interfaces that enable a targeting user to access the functions described below. A skilled reader will understand that the dashboard (32) may be customized by users, so as to reflect their preferences in accessing the functions of the present invention.

The user may click a button or link associated with the LinkedIn related functions of the content targeting utility (30) which may be implemented for example as a LinkedIn™ application that interoperates with the content targeting utility (30).

LinkedIn™ may present an authentication screen for providing LinkedIn™ related credentials. The user logs into the LinkedIn™ system.

The user logs into the LinkedIn™ system using their credentials.

The content targeting utility (30) accesses the user's profile and contacts through a LinkedIn™ API, which may be implemented as part of API (27).

The content targeting utility (30) presents to the user his/her contact list from LinkedIn™.

The user can search their contact network, for example by entering one or more search terms in a search window that may be presented by the content targeting utility (30). The search window may be linked to one or more search functions, or a search engine, which may be implemented as part of or linked to the inference engine (20).

The content targeting utility (30) filters the user's contact list based on matches generated based on the search query or queries. One or more information objects may be displayed by the content targeting utility (30) based on the search results, such as a list of contacts, or a summary of the contact record and a link to additional information relate to the contact record.

The user may select one or more of the displayed contacts for targeting using the content targeting utility (30).

In one implementation of the present invention, depending on the permissions assigned to the user through LinkedIn™, the user may also search more broadly than across their already existing contacts through LinkedIn™. A skilled reader will realize that various other variations are possible, including based on possible modifications or enhancements to the LinkedIn™ platform.

The content targeting utility (30) accesses the profiles associated with the one or more contacts (targeted consumers) from the LinkedIn™ system using the System access to the consumer's LinkedIn profile using the LinkedIn API, based on server calls initiated by the API (27).

The content targeting utility (30) searches the database (17) to determine whether there is an existing content interest profile (18) for the consumers selected for targeting.

For those for whom there is no content interest profile (18), or where based on one or more rules it is determined that the content interest profile (18) needs to be updated, the platform (10) initiates the profile builder (12) to build the relevant content interest profiles (18) for the relevant consumers.

In one implementation of the present invention, profile builder (12) creates the relevant consumer content interest profile (18) for the selected contacts by: (A) parsing and (B) scoring the relevance of the key phrases in the relevant profiles available through LinkedIn™, and optionally other information. In one implementation of the invention, (C) a third party semantic keyword processor may be used to enhance the content interest profile (18) such as Yahoo™'s Term Extraction Web Service API. The profile builder (12) optionally (D) applies one or more weighting techniques, so as to complete the content interest profile (18), as explained above.

In one implementation, the platform (10) then initiates the content matching utility (14) in order to search a defined set of authoritative of web publishers. In one example of operation of the invention, the Google Custom Search Engine API™ may be used for this purpose. The content matching utility (14), in one implementation, (A) generates a first subset of results, and then (B) utilizes the relevant content interest profiles (18) in order to prioritize the subset of results based relevance to the relevant consumers.

In one implementation of the invention, the platform (10) presents the prioritized content results with a heading and a brief summary describing each content item. In a particular aspect of the invention, the platform (10) may include or link to a document summarization system in order to summarize the content items returned by the present system.

In a particular implementation of the invention, the platform (10) may include or link to a utility that is configured to generate tag cloud visualizations for content interest profiles (18). The tag cloud visualizations in one aspect highlight for example related dimensions of each content interest profile (18). The targeting user may access one or more related dimensions, and thereby reduce the subset of results. Other mechanism to narrow or expand the results may be utilized.

In another aspect, the inference engine (20) may iteratively calculate, and display, a relevance score based on the degree of relevance of the currently matched subset of results based on the current content interest profile (18). The dashboard (32) may display the relevance score in conjunction with the relevant content interest profile (18) and a subset of matches, so as to enable the targeting user to interact with the dashboard (32) so as to adjust the content interest profiles (18).

A skilled reader will appreciate that content interest profiles (18) may be modified, for example augmented in a number of different ways. In one particular implementation, the dashboard (32) may optionally display a "AUGMENT PROFILE" button or equivalent. If the targeting user clicks this button, one or more functions may be accessed for increasing the accuracy of the content interest profile (18) and, therefore, relevance of the content based on the matching operations of the platform (10). (A) For example, the profile augmentation features may permit a targeting user to select one or more content interest profiles (18) and then (B) enables the targeting user to select one or more mechanisms for augmenting the selected content interest profiles (18).

For example, in one implementation, the augmentation mechanisms may include a mechanism for enhancing content interest profiles (18) based on information extracted from third party platforms. In one example, information may be extracted, using the API (27) from for example FACEBOOK™. The API (27) may be configured to connect to and provide login credentials to the FACEBOOK™ API in order to access the targeting user's friends for the consumer for possible matches. If the consumer is a FACEBOOK™ friend of the targeting user, then the profile builder (12) updates the content interest profiles (18) with additional information, if available. In one aspect, the system will infer consumer interests based on their relationship to brand Fan Pages and groups (Likes). The system will also infer interests and preferred source content from the content (text and links) the consumer is sharing on the system. FACEBOOK™ is primarily a social network (in contrast to LinkedIn™ which is primarily a professional network) and therefore the interests derived by the inference engine will tend to be recreational. For example, a salesperson may learn that Wayne is interested in Fishing because he "Likes" The Outdoor Network™ and Bass Pro Shops™ and posts links to fishing videos.

After a content interest profile (18) has been augmented, the content matching utility (14) may be initiated to run further matching operations.

In one implementation of the invention, the targeting user then determines which content items will be made available to the consumer(s).

The platform (10) may implement a variety of mechanisms of delivery content items to the consumer(s). In the particular implementation of this use case, content items found to be relevant by the platform (10) may be delivered to consumers using LinkedIn's InMail™.

The platform (10) may record the targeting user's action in order to update the relevant content interest profile (18) because there may be value in the logging the content items used to target the consumer(s), especially if the platform (10) has detected that the targeting user has reviewed content items for their relevance for targeting specific consumers. The matching profile weights may be adjusted to prefer the interest profile types (for example: skills, job history) that resulted in the selected matching content. The matching profile may also be adjusted to prefer the content sources or types that are selected (for example, news from mashable.com may be preferred in future searches. The amount of preference applied in either of these cases is proportional on the value of interaction where viewing an item is a low value interaction and sending an item is a high value interaction.

In one implementation, the platform (10) presents a series of links related to the content items and initiates an email builder with option to send through LinkedIn InMail™ using the LinkedIn™ API. The targeting user may also annotate content items or send a personal message. A message is then sent through LinkedIn InMail™ that may include links to the relevant content items.

In a further possible implementation, the platform (10) presents an mail builder or more generally a communication utility (35) with pre-defined communication templates that represent different modes, objectives, and styles of interaction. Optionally these templates may be customized by the user or through the administration console. Optionally the platform will populate the content of the communication with the relevant context of the content (why the content is relevant to the consumer) to further personalize the communication. Optionally the platform will recommend the template to use based on the nature of the relationship, the history of the relationship between the user and consumer, and behaviour and outcomes of users and consumers broadly on the platform.

The platform (10) may track the consumer's interactions with the content, and use this information to update the relevant content interest profiles (18), by operation of the profile builder (12). This allows the platform (10) to further tailor the targeting of consumers based on their interests.

In a further possible implementation, the platform (10) is configured to implement a rating mechanism, and to deliver content items in a way that consumers may rate the relevance of specific content items. The platform (10) may also enable the user to provide comments for example regarding the relevance of specific content items. This enables the profile builder (12) to update the relevant content interest profile (18), and also the resulting information is provided to the inference engine (20), including the machine learning functions implemented to the inference engine (20), in order to update insights implemented to the inference engine (20) regarding the matching of content to content interest profiles (18). A skilled reader will appreciated that the inference engine (20) may incorporate various analytical features and functions, as well as optionally data mining functions, in order to extract insights from the contents of database (17).

In a further possible implementation, the platform (10) will respond automatically to a favorable content item rating or simply the consumption of the content by the consumer with a search of a candidate entity collection (23) of contact profiles to recommend additional target consumers for the content.

In one implementation, the platform (10) further includes a reporting utility (42) that enables targeting users to access one or more reports or screens that enable the targeting users to view analysis regarding their targeting of consumers over time. The reporting utility (42) may also generate an outbound communication to the user notifying them of consumer actions by way of the messaging utility (34). A skilled reader will appreciate that the reporting utility (42) may generate a range of different types of reports.

Passive Content Discovery

Various users need to monitor developments in a number of domains. The platform (10) may also be used to provide novel and innovative solutions for users to access high relevant content based on a content interest profile (18) that is based in part based on interests of third parties such as for example clients of the user. In other words, while the disclosure describes the invention in terms of targeting consumers, the platform (10) may also be applied for the purpose of the users consuming the content, however, based on filtering content based on the interests of third parties.

Management consultants are one example of a group of professionals that need to keep up to date in one or more information domains. For example management consultants may have clients in a variety of industries and positions, and as a result may need to keep up to date in regards to recent developments in different information domains that relate to these industries or positions. For example, a particular management consultant may have clients in the marketing department of an automotive firm and the customer support center of a telecommunications company. The consultant therefore may require both expertise as it relates to the services that they are selling (functional knowledge) and also knowledge in developments relate to their clients and their industries, business and practices (ambient knowledge).

Consultants, for example, generally monitor developments as it relates to their functional knowledge by subscribing to trade journals, reading industry literature and news, and attending conferences. However, these approaches may require substantial time commitment, and also may not scale efficiently to cover the diverse range of subjects required for ambient knowledge.

The management consultant as described in this particular example of implementation of the present invention may use the platform (10) of the present invention to establish relationships with their clients they want to monitor ideally through a social network connection for example their Linked In™ profile. The content interest profile builder (12) analyzes the social media interactions to determine content interest profiles (18) automatically.

In accordance with a passive mode, the content matching utility (14) may search for relevant content periodically. The platform (10) may prioritize content and present the most relevant content based on their relevance based on the interests of one or more consumers selected by the user.

In one implementation, the platform (10) of the present invention is configured to search for relevant content using the content matching utility (14) periodically. For example, when users have time for professional development or undirected content consumption, the system would present the most relevant content for their consumers. The system may also prioritize content based on the intersection of the user's content interest profile (18) that of their consumers.

Passive content discovery for a highly targeted list of people is challenging on the web, using prior art solutions. A user generally is required to search through publicly available data sources regarding their selected consumers in order to identify keywords and then construct efficient and effective web searches manually. These may then be scheduled as Google Alerts or similar automated, scheduled web searches but unless the user is an expert in web search it is unlikely these will produce sufficiently relevant content to be useful. This approach is successful when the user is personally engaged in the topics so they can invest sufficient time to tune the results and can apply expert judgement to assessing relevance to their objective. This is not the case of professionals managing client relationships where the clients and their interests may be too fluid to allow for tuning and the interests may also too be distinct from the user to allow for the application of expertise in tuning the alerts.

Passive content discovery is an extension of the Active Content Discovery example. In one possible implementation of the present invention, the Active Content Discovery application of the technology of the present invention is used to identify a portfolio of specific consumers. The user could, however, initiate the process at the LinkedIn™ authentication step and select contacts solely for the purpose of passive content discovery. This case assumes a user has selected one or more consumers to guide content discovery.

The platform (10) periodically runs the content matching utility (14) to refresh an index of relevant content that is maintained by the platform (10) for the user's set of consumers.

The user, on demand, launches the content curation platform (16) of the present invention, for example using a web browser. Alternatively the content curation platform (16) may run autonomously on a schedule and generate an external communication to the user (e.g. email, CRM notification, application notification) notifying them of new content matches.

The content curation platform (16), is configured to present the current results obtained using the content matching utility (14) across all of the selected consumers. Results may be mixed for all consumers based on user relevancy as determined by currency, a relevance score relative to the selected consumers, relevance score to the user, and optionally a position modifier for each consumer. For example, the initial relevance score for 3 articles matched to a specific consumer may be 4.5, 3.2, 2.1 and the position modifier is 1/position so the results would be 4.5/1=4.5, 3.2/2=1.6, 2.1/3=0.7. In this way, in one implementation a preference for diversity of content across the consumers is encouraged in the platform (10).

The user may use a dashboard associated with the content curation platform (16) to add or remove consumers to further refine the subset of results for example by toggling the consumer profiles on or off in the dashboard.

The content curation platform (16) may present a series of links that the user can click in order to read a particular content item. In one implementation, the content curation platform (16) may present the original content in a frame along with the matched consumers and the associated relevancy scores in order to assist in navigating the content obtained by the content curation platform (16).

Optionally, the user can then select the consumer(s) to also receive the matched content selecting one or more consumer using the dashboard.

Subsequently, the distribution and tracking of consumer's interactions with the content may happen in the same way as described above under the Active Content Discovery mode.

New Connection Discovery

What follows is a possible implementation of the platform (10) and related computer implemented methods, relating to new connection discovery. The example provided below relates to a possible implementation of the invention that is integrated with a social network (LinkedIn™). Examples that follow illustrate modifications to the LinkedIn implementation needed to integrate other data networks, specifically salesforce.com/data.com, and an integration with data sources internal to the invention. The features explained below are only representative of possible functions and features that may be included in the platform (10). A skilled reader will understand that the platform (10) may be integrated with numerous other platforms.

Social Network Implementation (LinkedIn™)

A user may launch the content targeting utility (30) using a web browser loaded on the user's network-connected device. A content targeting dashboard (32) may be linked to the content targeting utility (30) which may include a series of screen interfaces that enable a targeting user to access the functions described below. A skilled reader will understand that the dashboard (32) may be customized by users, so as to reflect their preferences in accessing the functions of the present invention.

The user may click a button or link associated with the LinkedIn™ related functions of the content targeting utility (30) which may be implemented for example as a LinkedIn™ application that interoperates with the content targeting utility (30).

LinkedIn™ may present an authentication screen for providing LinkedIn™ related credentials.

The user logs into the LinkedIn™ system using their credentials. It should be noted that once the platform (10) is authorized it may function autonomously for example on a schedule to identify and recommend new connections until it is de-authorized or its authority expires.

The content targeting utility (30) accesses the user's profile and connections through a LinkedIn™ API, which may be implemented as part of API (27).

The networking utility (37) may optionally perform an analysis of the user's social graph for example their 1st and 2nd degree connections using the interest profile builder (12) to cluster content interest profiles (18) and discover the most important content interest attributes (22). An example of an output of this process would be Accountants in Information Technology & Services companies with less than 100 employees in Toronto is the dominant interest profile cluster (18). The networking utility may select, with or without user input, a collection of interest profiles that will be used to identify and prioritize new connections in the user's extended network. The profiles may be referred to as targeted interest profile clusters (39).

The networking utility (37) may perform an analysis of the target manager (36) data to further develop the targeted interest profiles clusters (39). The target manager (36) data includes for example: which targets the user has viewed, or shared content with and how often and any priorities the user has set on specific targets. The target manager (36) provides an indication of which contacts are most important within the entirety of the user's social graph. In one implementation of the platform, weighting the interest profiles (18) of these most important connections higher increases the value of the new connections identified.

The dashboard (32) may prompt the user to complete a wizard-style sequence of screens that specifies to the platform (10) which content interest attributes (22) the user is targeting to expand their network. The data collected by the wizard modifies the targeted interest profile clusters (39). The user may optionally modify this data through a settings option in the dashboard (23) interface.

The networking utility (37) may direct the platform (10) to construct a matching profile (28) for the targeted interest profile cluster (39) which is then used by the content matching utility to match interest profiles. In one specific implementation with LinkedIn, the indexing utility (31) operating on the candidate entity collection (23) of 2nd degree connection profiles is performed by LinkedIn. The content matching utility (14) performs the match by calling the LinkedIn People Search API through the API (27)

connection with LinkedIn with the parameters specified by the matching profile (28). The outcome of this function in this specific implementation is a list of recommended connections from the user's 2nd degree LinkedIn network. This may for example be a search where current title is accountant, the personal industry is Accounting, the location is Toronto Area and the connection depth is second degree. In this example a secondary matching on Information Technology and Services industry for the current position industry is required because the LinkedIn People Search API may not support a filter on position industry. The networking utility (37) may optionally score the In other implementations with LinkedIn, the candidate entity collection may not be limited to 2nd degree connections and may include the user's 3rd degree network, group memberships and other extended network relationships.

The dashboard (32) may present the recommended connection profile matches as a user-filterable list or as individual events. The messaging utility (34) may also notify the user of new relevant matches.

The user may select a recommended connection to act on. Actions the user may take may include: dismiss, save for later, get introduced, or connect directly.

If the user chooses to dismiss the recommendation, the platform (10) records this action to optionally exclude the connection from a future matching process.

If the user chooses to save the connection for later, the platform (10) records the connection information and may create a follow up event to prompt the user for action at a future date.

If the user chooses to connect directly, the communication utility (35) displays a 'request to connect' template the user may optionally modify. The platform sends the request to connect through the LinkedIn Communication API.

If the user chooses to get introduced to the connection, the dashboard (32) presents a list of shared connections from the user's first degree connections. In other implementations there may be no shared connections or the connections may not be explicit, in which case the platform (10) may identify introduction paths (e.g. connections that share connections) or suspected connections (e.g. same employer and same location).

In one implementation when the user selects a connection to perform the introduction or referral (known as an introducer), the dashboard (32) displays options to act on the introduction including 'get back in touch' and 'request introduction'.

If the user chooses to 'get back in touch' with the introducer, the content targeting utility (30) invokes the interest profile builder (12) to construct a content interest profile (18) for the introducer. The content matching utility (14) then matches to the relevant content database (17) to identify relevant content for the introducer as discussed in the active content discovery implementation. The user may then select a relevant content item to send in the message although this is not required. The communication utility (35) displays templates specific to the 'get back in touch' context which the user may further configure or edit. The user may also specify whether to send the communication via LinkedIn's InMail or an alternate sender. When the user chooses to send the message, the platform delivers the message to the selected platform through the API (27) or other connection, for example a 'mail-to' link. The platform may also create a follow up event for the user to follow up on the introduction request after some specific period or based on some event, for example when the introducer consumes the content shared.

In one implementation the user may be presented with the option of finding content relevant to the recommended connection. This content may be optionally sent to the connection, if the destination (e.g. email address) is known by the user or platform, or sent to the introducer with instructions to forward the content to the recommended connection. In this implementation, the communication utility (35) would suggest specific templates and may present the user with destination options (introducer, recommended connection).

In one implementation, the tracking utility (29) will monitor progress on the introduction including optionally the successful terminus of the introduction when the recommended 2nd degree connection becomes a 1st degree connection of the user. The tracking utility (29) may optionally communicate activity to the learning utility (26). The learning utility (26) may update the targeted interest profile clusters (39) based on for example the introductions acted on by the user and the outcome of the introductions. The learning utility (26) may also update the models used by the networking utility (37) to prioritize the possible introduction paths. The learning utility (26) may also update the target manager (36) for both the introducer and the recommended connection.

In one implementation, the platform (10) further includes a reporting utility (42) that enables targeting users to access one or more reports or screens that enable the targeting users to view analysis regarding their targeting of recommended connections over time. The reporting utility (42) may also generate an outbound communication to the user notifying them of consumer actions by way of the messaging utility (34). A skilled reader will appreciate that the reporting utility (42) may generate a range of different types of reports.

Integration with Marketing Platforms, or Business Directory Platfoms(Salesforce.Com Data.Com, Etc.)

In one implementation of the platform (10) the invention may be integrated with a variety of third party marketing platforms.

For example, the platform may be integrated with salesforce.com (a customer relationship management system) and data.com (a business directory service). This implementation could optionally include a LinkedIn integration or other networking service. The implementation may be similar to the LinkedIn integration with the following notes. In one implementation, the platform (10) is integrated within the salesforce.com user interface thereby eliminating the authentication steps 2,3,4. In step 5, the source for social graph data is now the CRM contact records in salesforce.com. Steps 6,7,8, would function in a similar way. In step 9, the source the content database is now the data.com repository which is access for matching purposes through the API. The preferred mode of interaction would remain a query construct with secondary matching within the platform (10). In step 10, the messaging utility (34) may optionally communicate through messaging and alerts or tasks or similar communication mechanisms in the salesforce.com platform. The subsequent steps function in a similar manner with the additional feature that any data generated at any step may be written through the API to the CRM, for example requesting a new introduction may record an update the introducer contact record, the recommended connection contact record, and the users activity history in the CRM.

The platform of the present invention can also be integrated with marketing automation platforms such as Eloqua™, Marketo™, ExactTarget™ and other similar platforms and platforms that provide similar functions.

Marketing automation platforms are typically implemented as web platforms and are designed to identify to sales leads and to nurture those leads by sending relevant content to support their purchasing decision. The platforms often have intelligence to decide when and which content to send based on tracking the behavior of the lead (content consumer). It should be apparent to one skilled in the art that this method of using content to build relationships is complementary to the methods of the invention.

In one embodiment of the invention, the components may be consumed as services for example through an API (27) by an external application; examples of external systems include but are not limited to marketing automation platforms, customer relationship management systems, a client communication portal and social media management platforms.

The following implementation describes a possible integration with a marketing automation platform but the integration may optionally apply to other external systems and platforms. It should be apparent to one skilled in the art that the integration is not limited to following description, generally any data generated or recorded in the platform (10) and the marketing automation platform may be exchanged at any time. Additionally the following the integration may not be limited to data but may optionally include an integration of the externally facing components of the platform (10) including the user interface of any component of the invention or the messaging utility (34).

In one implementation of the platform (10), the marketing automation platform may be an online source (25) for interest profile data which may also optionally include references to other online sources (25). For example, the marketing automation contact database may communicate a collection of profiles with references to Facebook™ accounts. The platform (10) may extract profile data from the marketing automation database and extract and merge profile data from the related Facebook™ accounts. The platform may require authentication to complete this step which may optionally be executed from the marketing automation platform through the API (27). It is recognized that the online sources (25) are dynamic and would be updated over time in a push or pull communication process through the API (27).

In one implementation of the platform (10), the platform (10) may optionally communicate the content interest profiles (18) generated by the interest profile builder through the API (27). The profiles may be generated based on data from marketing automation platform or from online sources (25) associated with a user's account or a combination of both. These profiles may be further combined with content interest profiles (18) generated by the platform (10).

In one implementation of the platform (10), communication activity and profile data from the marketing automation platform would be recorded by the tracking utility (29) which would for example update the target manager (36) with communication activity or communication preferences recorded in the marketing automation platform or the learning utility (26) with, for example, data on consumption rates by content type or topic. The tracking utility (29) may also communicate platform (10) user and consumer behavior data to the marketing automation platform for example to update the topics and types of interest to the target consumer or target consumer cluster.

In one implementation of the platform (10) the target manager (36) may exchange data through the API (27) with the marketing automation platform for example communication configuration data for the user or target consumer for example the tone, style, and communication templates set in or used by the communication utility (35).

In one implementation of the platform (10) the networking utility (36) may exchange data through the API (27) with the marketing automation platform for example the target interest profile clusters (39). For example the networking utility (37) may learn through user input and behavior (e.g. introduction requests) the user is targeting new relationships with Marketing Executives in the Technology industry at Small and Medium Enterprises and communicate this target interest profile cluster (39) to the marketing automation platform to guide the marketing automation platform to communicate marketing content relevant to the cluster to the user's client and prospect network.

Application Implementation (Internal Platform)

In another implementation the networking utility (37) functions to match users of the platform or the social graphs of users of the platform (10). For example, if the invention was implemented as part of a Facebook™ application, the networking utility (37) would have access to the other users through an internal content database (17) of user profiles and the application would access to the friends of the users as a content database (17) for the content matching utility (14) to act on. This implementation may recommend connections that are only related to the user through another user of the platform (10) or may be users of the platform (10).

New Connection Attraction

In one implementation of the invention, the platform (10) is integrated with advertising and marketing platforms to build a brand network and brand awareness. Brands may represent companies, products, individuals and others. What follows is a possible implementation of the platform (10) and related computer implemented methods, relating to new connection attraction. This example illustrates a possible integration with the Facebook platform. In this example a brand is required to have a Facebook page and a Facebook ads account. The objective of the implementation may include attracting new friends, driving new likes or followers, or simply to increasing page views.

A user may launch the content targeting utility (30) using a web browser loaded on the user's network-connected device. A content targeting dashboard (32) may be linked to the content targeting utility (30) which may include a series of screen interfaces that enable a targeting user to access the functions described below. A skilled reader will understand that the dashboard (32) may be customized by users, so as to reflect their preferences in accessing the functions of the present invention.

The user may click a button or link associated with the Facebook™ related functions of the advertising integration utility (38) which may be implemented for example as a Facebook™ application that interoperates with the content targeting utility (30).

Facebook™ may present an authentication screen for providing Facebook™ related credentials.

The user logs into the Facebook™ system using their credentials. It should be noted that once the platform (10) is authorized it may function autonomously for example on a schedule to identify and recommend new connections until it is de-authorized or its authority expires.

The content targeting utility (30) can now access the user's profile and connections as well as management of their Facebook™ Ads account (for example to create and manage campaigns) through a Facebook™ API, which may be implemented as part of API (27).

The user may choose to initiate a Facebook ad through the advertising integration utility (38) interface. The user may select from the current set of targeted interest profile clusters (39) or modify or add a new cluster. The advertising integration utility (38) translates the clusters into the demographic and topical and other audience targeting modes available through the Facebook Ads API.

The user may optionally set the campaign variables for example budget, duration, frequency.

The advertising integration utility (38) displays the communication utility (35) for the user to select from advertising templates to deploy in the campaign. The user may optionally modify existing templates or create new ones.

The user may also elect to perform a content match to populate the ad for example to create a sponsored post.

Twitter Implementation

What follows is a possible implementation of the present invention for use in conjunction with TWITTER™ and other similar platforms and platforms that provide similar functions. Other platforms include a company on LinkedIn™ addressing their followers or a brand on Facebook™ addressing their audience (Likes).

Active Content Discovery in TWITTER

Networked micro-blogging platforms such as TWITTER™ are widely used. Many users invest significant resources in their selection and creation of content for distribution to their TWITTER™ audience of followers, but there are few prior art solutions that enable the targeted selection and creation of content based on up to date knowledge of their audience's interests. Some prior art tools exist that enable users to assess a user's authority or network reach generally, to enable marketing and public relations groups to prioritize TWITTER™ users for example to conduct outreach campaigns (product trials or previews) or to monitor for relevant influential discussions.

Active users of TWITTER™ are generally interested in increasing their following (for example by creating a reciprocal follower), and also ensuring that they are creating content that is relevant to their followers. However, TWITTER™ and other similar platforms do not generally enable analysis of the interests of followers. TWITTER™ does provide certain tools that enable some surface audience analysis based on stated demographic information, implied demographic information, or fixed categorical classification. However, the available level of analysis may be insufficient for a user to attain an accurate understanding of his/her audience's interests over time. This makes it difficult for TWITTER™ users to assess and understand how well the content they publish serves the interests of their audience until it's too late and those members leave or "unfollow" the user.

The present invention provides a solution to this significant problem.

Therefore, in one implementation of the present invention, the platform of the present invention may be used in conjunction with a micro-blogging platform such as TWITTER™. What follows is a representative user workflow based on a user utilizing the platform of the present invention to improve the targeting of TWITTER™ followers:

The user launches the content targeting utility (16), for example using a browser.

The platform (10) may present the Twitter™ authentication screen. The user enters his/her credentials and logs into the TWITTER™ platform. The user enters his/her credentials and logs into the TWITTER™ platform.

The platform (10) accesses the user's TWITTER™ profile, and uses the TWITTER™ API to access information regarding the user's friends and followers.

Optionally, the platform (10) prompts the user to select specific followers or friends, or both. In one implementation of the present invention, the content targeting utility (16) may display to the user one or more suggestions regarding selecting the specific followers or friends. In one particular implementation of the present invention, the user may be prompted to select one or more of their TWITTER™ followers whom they believe represent the interests of the audience segment that they wish to target with their content through the TWITTER™ platform.

The platform (10) may initiate the profile builder (12) to analyze the posts of the user's followers, profiles, and connections to:

determine which followers are legitimately interested in the user's posts (eliminating spam bots or fake users) and create a sub-set of legitimate followers;

select a sample of legitimate followers to build an aggregate content interest profile (using the techniques described above); and extrapolate the sample to the entire population of the user's TWITTER™ followers.

The system displays the content interest profile (18) of the follower population through the content targeting utility (30). The content interest profile (18) may be represented for example as:

percent of the audience interested in a specific key phrase;

relative interest level of a key phrase as determined by relevance of the key phrase to each audience member and the number of audience members the key phrase is of interest to.

The user can then replicate and change the content interest profile (18) to include combinations of specific key phrases.

The platform (10) in one implementation stores the original content interest profile (18) as a "Primary Audience Interest Profile" and also optionally a plurality of different content interest profiles (18) associated with the user account, that map to group or segments of the user's TWITTER™ audience, including based on use of one or more segmentation techniques. Segmentation may occur through a semantic analysis of the users' profiles, for example to find high value job titles like CEO and Founder. Segmentation may also occur through linked information sources for example TWITTER™ profiles maybe be matched to LinkedIn™ profiles which adds considerable dimensions for segmentation for example Job Title, Employer, City, Country, Education Level.

In a further aspect, the platform (10) analyses the user's post history (for example TWITTER™ Stream) to develop a personal content interest profile (18) for the user.

The platform (10) then analyses the user's post history including the source content of any referenced URL links using for example the Yahoo™ Term Extraction Web Service API and then the content matching utility (14) assesses how relevant that post was to the audience based on the Primary Audience Interest Profile, and then the platform (10) may present for example a relevancy score. If the user has multiple interest profiles, in one aspect the platform (10) assesses which of these most closely matches the content posted and presents the results to the user.

In one possible implementation, the platform (10) initiates the display to the user of information associated with the results for the multiple content interest profiles (for example a summary of each profile and an associated relevancy score, based on mapping the content interest profile to a particular segmentation of the user's TWITTER™ audience), thereby enabling the user to review the extent to which different audience segments have been served by the user's targeting activities. This may trigger the user to for example (A) find new content that is generally more relevant (3) review which content interest profiles (18) have been best served by their recent publishing activity and then select an interest profile for which to find new content. In other words the platform (10) enables a user to manage multiple consumer interest profiles (18) that map to the user's TWITTER™ audience, and find highly relevant content and redistribute the content through TWITTER™.

The system analyzes the consumer's profile using the profile builder (12) to create an interest profile by parsing and scoring the relevance of the key phrases in the consumer's profile using a semantic keyword processor such as Yahoo™'s Term Extraction Web Service API and then weighting their sources.

The platform (10) initiates the content matching utility (14) to search the defined set of authoritative web publishers using for example the Google™ Custom Search Engine API.

The platform (10) may initiate the content matching utility (14) then creates a subset of the matched results and then prioritizes the results based on relevancy.

The platform (10) may also assess the relevance to the user's interest profile and present the relevance assessment to help the user determine which item they're interested in reviewing.

The user may choose to enhance their profile by referencing URLs of content items of interest or pasting in the text of content items of interest. The user may also associate additional platform profiles, for example their LinkedIn profile.

The platform (10) captures this additional information through the Content Targeting Utility and processes it using the Content Interest Profile Builder to modify the interest profile of the user User selects a content item to review.

Platform (10) records the action of the user to update the content interest profile builder (12) model by using the learning utility (26)

Platform (10) presents the original content item for the user to read.

The user can optionally bookmark the item for later review if they want to consider a number of possible items prior to publishing.

The platform (10) stores bookmarks as URLs for later access by the user.

The user chooses to post a reference to a specific URL by selecting the Tweet option.

The platform (10) creates a unique, shortened URL that is a platform (10) controlled redirect to the source content and writes it into a dialogue window for the user to compose the rest of the post. The platform (10) encodes specific parameters in the redirect page that notifies the publisher's inbound analytic tracking platform (10) the source of the referral for example the user's Twitter name.

The user completes the post and clicks to publish or saves as draft.

The platform (10) stages draft posts for later access by the user.

The user selects the post to publish and clicks publish.

The platform (10) publishes the post to the user's twitter stream through the Twitter API.

The platform (10) records any clicks on the shared link with the audience and may optionally notify the user.

The platform (10) updates the interest profile based on which content is consumed (clicked on by users) and updates the content interest profile builder (12) parameters by using the learning utility (26)

The platform (10) also monitors the network generally for mentions of the user and re-tweeting of posts and adjusts the interest profiles accordingly.

The platform (10) reports on shared URL click-through rates along with related follower behaviour like re-tweeting to the user through the content targeting utility (30).

Passive Content Discovery in TWITTER

Assessing the interests of an audience, particularly over time, is a challenge for major content producers. Film and television producers invest substantial budgets in audience research using means such as behavioural monitoring and focus groups. This investment is impossible for professionals publishing to communicate their authority or utility. Platforms such as TWITTER™ publish information on trending topics but these are too generic and timely to resolve reliably to relevant content.

Passive content discovery for a broad set of interests is challenging on the web. Often the state of the art is to follow editorial outlets that are aligned with the publisher's interest. The outlets are often too broad like a newspaper or too narrow like following a curated subject.

Passive content discovery is an extension of the Active Content Discovery case. In the general case a user would have a portfolio of specific consumers identified through Active Content Discovery case. The user could, however, initiate the process at the LinkedIn authentication step and select contacts solely for the purpose of passive content discovery. This case assumes a user has selected one or more consumers to guide content discovery.

The platform (10) periodically runs the content matching utility (14) to refresh the index of relevant content.

User launches the content targeting utility (14) through a web browser.

The platform (10) remembers the user and their credentials and authenticates.

The platform (10) presents the results of the latest content matching utility (14) operation across all of the selected interest profiles. Results are mixed for all interest profiles based on user relevancy as determined by currency, relevance score to the interest profile, relevance score to the user, and position modifier for each interest profile. For example, the initial relevance score for 3 articles matched to a specific interest profile may be 4.5, 3.2, 2.1 and the position modifier is 1/position so the results would be 4.5/1=4.5, 3.2/2=1.6, 2.1/3=0.7. In this way, a preference for diversity of content across the interest profiles is encouraged in the platform (10).

The user may add or remove interest profiles to further refine the subset of results by toggling the interest profiles on or off.

The user selects an item to read by clicking on the link.

The platform (10) presents the original content in a frame along with the matched interest profile and the relevancy scores.

The user can then select to post the content on TWITTER™.

The distribution and tracking then functions in the same way as the Active Content Discovery—Narrow case.

Consumption Use Cases

Consumption use cases start with content and seek to assess what audience or individual it's relevant to them. There are no prior art solutions that automate this task. It is a common behavior for users to share content through web utilities like ShareThis™ or more commonly through email but this it is entirely the responsibility of the user to determine to whom the content would be relevant. A manual approach is both inefficient and inaccurate, requiring an exceptional amount of constructive effort to identify every possible contact match to every content item the user consumes. It is also exceptionally distracting from the primary activity of consuming content.

As our social networks expand they reach thresholds of cognitive awareness (there are social network theories that have attempted to calculate the threshold—such as Bertrand's number). Other theories suggest that the value of social networks is a function of the number of members in the network. The present invention helps to resolve the need to expand a social network despite the limited capacity of people to maintain valuable relationships with that network. The present invention improves the quality of social interactions and consequently the quality or health of the networks themselves by enabling engagement that is based on sharing more highly valued content furthermore enables new forms of social networks that rely on better matching of interest between social network members.

There are many implementation possibilities for this embodiment of the invention for example the system could be deployed as a feature in a dedicated reading device or reading application such as KOBO™ or KINDLE™ or as an application in a multipurpose device such as an iPad™ or as a browser plugin as discussed below. A skilled reader will recognize that there are applications for this technology wherever digital content is consumed.

Browser Plugin Implementation

One mode of implementation of the passive recommendation engine is through a browser plugin which runs as a complimentary service within the user's web browser. For users that read newspapers and magazines online or even just blogs and video, the platform (10) will recommend contacts from their networks that would find the content relevant. An alternate implementation would be for the websites themselves to embed code as in an iframe on their pages that would enable the platform (10) to run much like the Facebook Like button. In this case the user would not need to install a plugin, they would simply sign in to the platform (10) directly on the page they're reading when they click the embedded button for the platform (10) or the platform (10) will preserve their signed in state across the session. Users will also be able to persist their sign in across multiple sessions.

To further distinguish between the two implementations, a browser-plugin requires user action to install whereas an embedded button requires a web content publisher action to update their web page code. A discussion of the browser plugin follows.

User installs the browser plugin.

Platform (10) presents the options of networks to access to configure the platform (10).

The user selects the platform (10) to access (e.g. LinkedIn, Twitter, Facebook).

Platform (10) presents authentication requirements.

User enters network credentials.

The platform (10) analyzes the user's network to build interest profiles for the user's contacts and the network in aggregate using the Content Interest Profile Builder. If the user is already registered as a user in the Discovery Use Cases, the platform (10) will default to the collection of contacts the user has identified.

The platform (10) prompts the user to navigate to a web content source (e.g. New York Times or Wired Magazine).

The user navigates to a web content site.

The platform (10) presents the option to find relevant contacts for the site through a browser frame message.

The user chooses to enable the platform (10).

The platform (10) analyzes the current page to determine the major content items and remembers to automatically scan the site content in future sessions.

The platform (10) submits the major content items to the content matching utility (14) which identifies the interest profiles with a relevance score above the acceptable threshold The platform (10) presents a count of the matching interest profiles and an overall interest score based on the aggregate network interest profile The user selects the count message (button).

The platform (10) presents the list of matching contacts and the relevancy score for the content item.

The user may select a contact to view the original profile data and the interest profile key phrases that the content matching utility (14) assessed as relevant to the content item.

The user can select one or more contacts to directly message the content item to or elect to post the item to their activity stream.

The platform (10) creates a unique URL that redirects to the original content item.

The user elects to send the link by LinkedIn's InMail and selects the contacts to message.

The platform (10) presents the InMail editor through the LinkedIn API with the link to the content item and with the contacts selected for distribution by the user.

The user completes the message and sends.

The platform (10) tracks the activity to update the content interest profile builder (12) with the matched interest profile traits.

The platform (10) records any click-through activity by the recipients and notifies the user through the browser plug-in.

The user may choose to add or remove a contact or all contacts (to add selectively) from the collection of interest profiles by selecting the count message.

The user may also choose to add or remove sites from the list of sites to automatically run through the content matching utility (14).

Further Implementations

Examples of Possible User Interfaces

Various user interfaces and associated user or system workflows may be provided in order to implement the invention.

Figure 5:
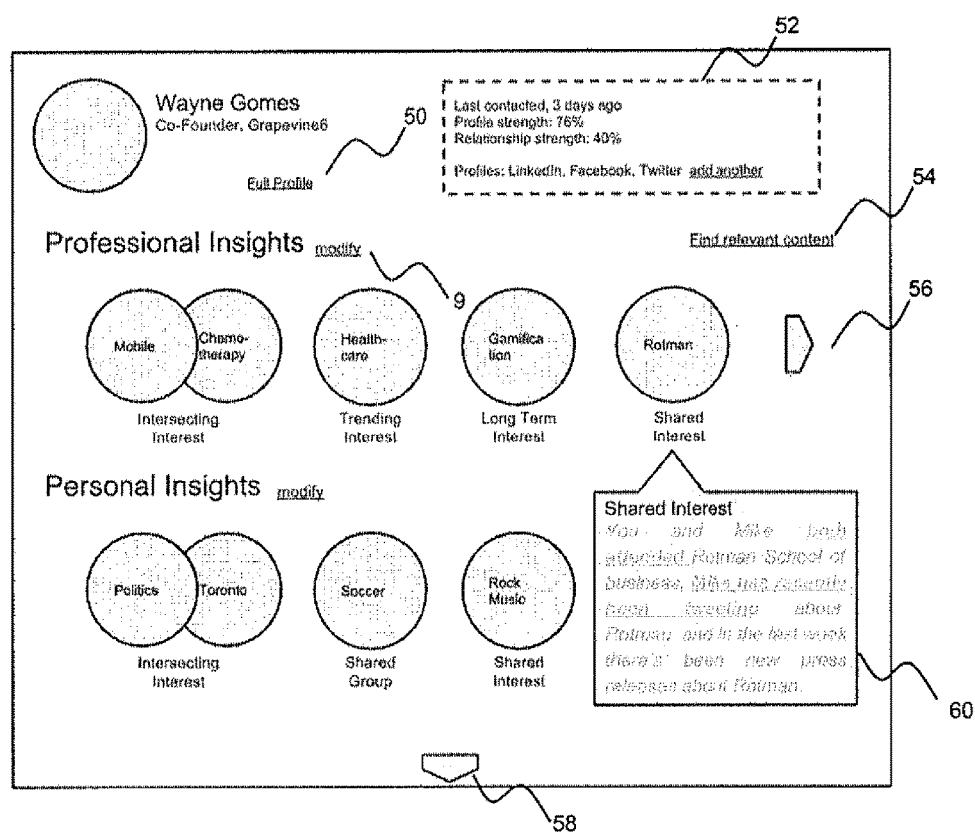
FIG. 5 is a diagram representing a possible user interface for accessing functions of the computer system of the present invention, namely for generating, managing and viewing insights associated with a target.

FIG. 5 is a diagram representing a possible user interface for accessing functions of the computer system of the present invention, namely generating, managing and viewing insights associated with a target.

FIG. 5 shows a representative consumer contact page. A user can access a full profile using a link (50). In this implementation "professional insights" and "personal insights" generated by the profile builder of the present invention are presented. The insights presented may be based for example on the target's name, location, job title and industry, as well as communication history. The insights page may include an area (52) that summarizes key attributes of the targeting user's relationship with the consumer, for example a "profile completeness rating" and a "relationship strength rating", which may be generated dynamically and iteratively by the computer system of the present invention. Insights may be represented as digital objects (such as circles in the particular representation of FIG. 5) and can be arranged in priority sequence, and may be labelled based on type of insight (whether professional or personal) and also based on how the insight was derived (for example whether based on work history or social media posts). The insights page may also show intersections of interests (which may be presented in a separate window); shared interests (between for example targeting user and consumer (60)). The targeting user can provide credentials to access third party systems if need be, and also can add personal insights to those generated by the system, which thereafter are used by the system. The targeting user can also delete insights if they are not valid or are to the targeting user's knowledge not interesting enough to the consumer. The targeting user can initiate a "FIND" button or equivalent (56) in order trigger the system to find collections of matching content. The targeting user can scroll through a display of insight groups not in the initial display (58).

Figure 6:
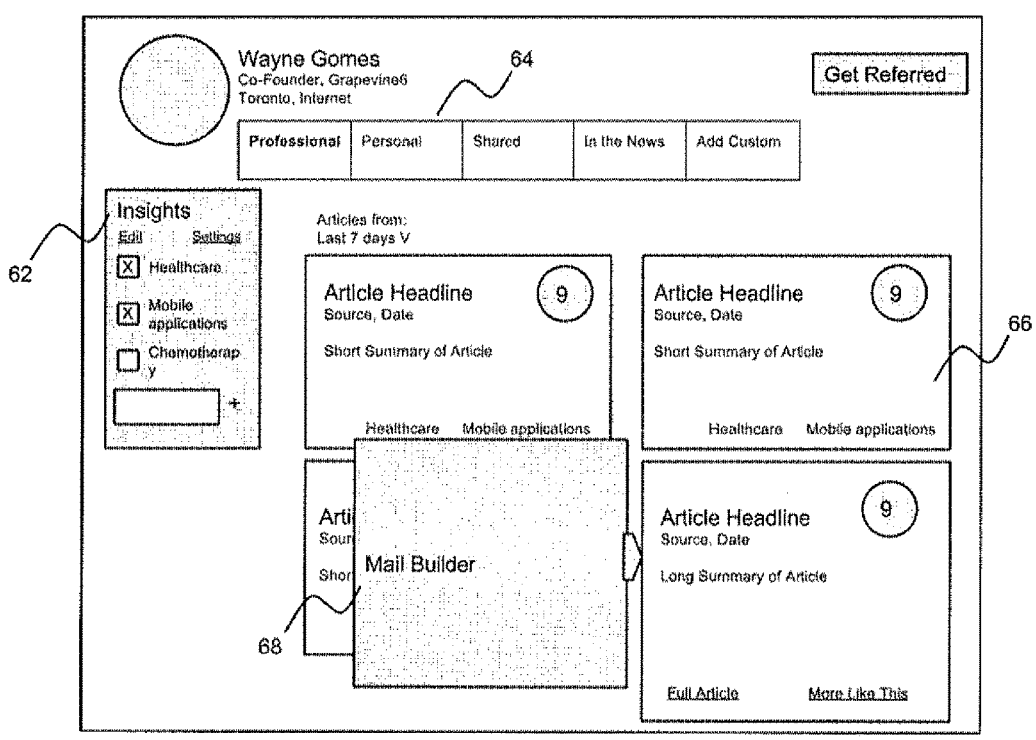
FIG. 6 is a diagram representing a possible user interface for accessing functions of the computer system of the present invention, namely for managing consumer targeting functions.

FIG. 6 is a diagram representing a possible user interface for accessing functions of the computer system of the present invention, namely for managing consumer targeting functions. The system can initially display a summary of key attributes relevant to targeting a particular target consumer. For example, a summary of insights can be presented (62). Significantly, the targeting user can add, including iteratively, further insights. The computer system can generate tabs corresponding to different "topics" of interest the consumer, which may be for example "Professional", "Personal", "Shared" (i.e. interests shared between the consumer and the targeting user, which content generally is provides a good springboard for engagement around content); "In the News" (referring usually to the consumer being in the news, which can trigger a congratulatory communication or helps the targeting user be up to date regarding the consumer's activities) and "Add Custom" which allows the targeting user to add other topics. In addition, for each tab, a series of tiles (66) may be presented as thumb nails of relevant content, which the targeting user can review easily. Tiles may present a headline and also possibly a summary of the content. Tiles may be stacked or otherwise arranged to permit the targeting user to easily review relevant content, based on a manageable set of objects. The tiles may be presented based for example on a ranking based on relevance. In one implementation, each tile presents a summary of an article. In another possible aspect, when a user selects an article, the summary article expands to display an extended summary with the option of viewing the full article. The user may also select a "more like this" button or equivalent, so as to trigger the system to select more articles that are similar to the selected article. A button may be linked to the mail builder (68) in order to initiate immediate communication of content.

Tiles may be associated with a relevance score, for example displayed as a number from 1 to 10 shown in a circle associated in each tile.

The target consumer may be notified of a new content match from one of their connections through a variety of messaging platforms. Also, the identification of relevant content may trigger an action item, for example in a CRM. Relevant information may be displayed in a number of ways such a series of links, article summaries connecting to full content and so on.

Figure 7:
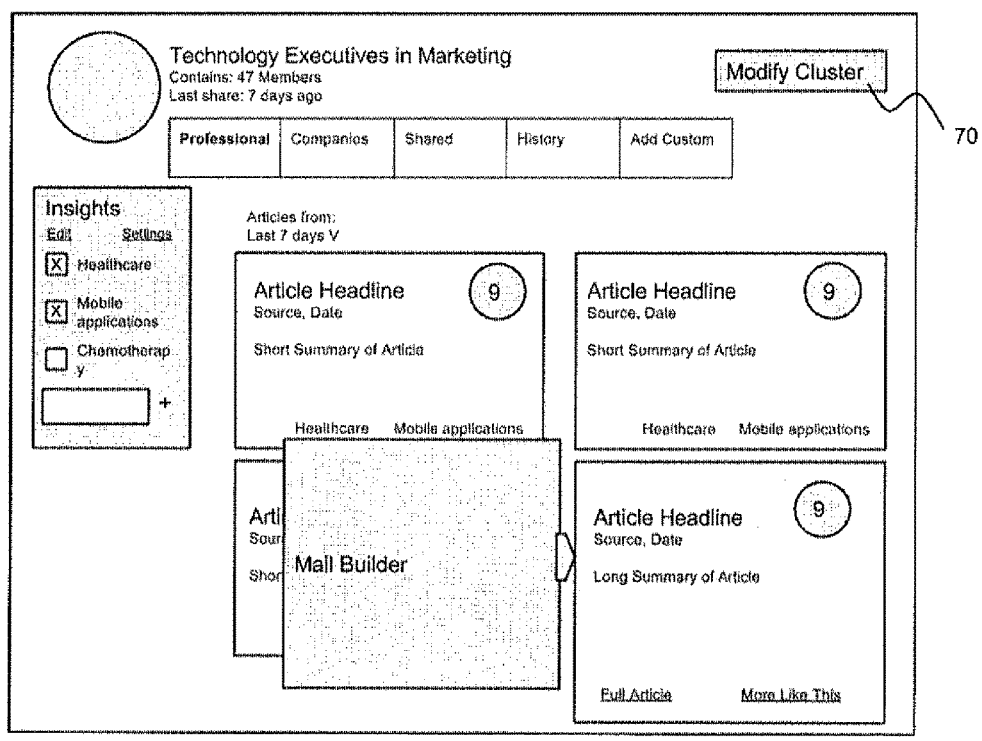
FIG. 7 is a diagram representing a possible user interface for accessing functions of the computer system of the present invention, namely for targeting clusters of consumers.
Figure 9:
FIG. 9 is a diagram representing a possible user interface for accessing functions of the computer system of the present invention, namely for managing consumer cluster settings.

FIG. 7 is a diagram representing a possible user interface for accessing functions of the computer system of the present invention, namely for targeting clusters of consumers based on the functionality described earlier. FIG. 7 is similar to FIG. 6, except that rather than presenting information relevant to a single consumer, information is presented for a cluster of consumers, where the cluster and associated insights is generated by the computer system. In this case the cluster is assigned the name "Technology Executives in Marketing". A "Modify Cluster" (70) button or equivalent allows the targeting user to tune cluster attributes such as membership. FIG. 8 shows possible cluster settings which an authorized targeting user can modify. Members may be removed, and associated information may be edited. FIG. 9 shows further cluster related settings that may be modified such as associated resources, weights to be applied to specific resources, and so on.

Figure 10:
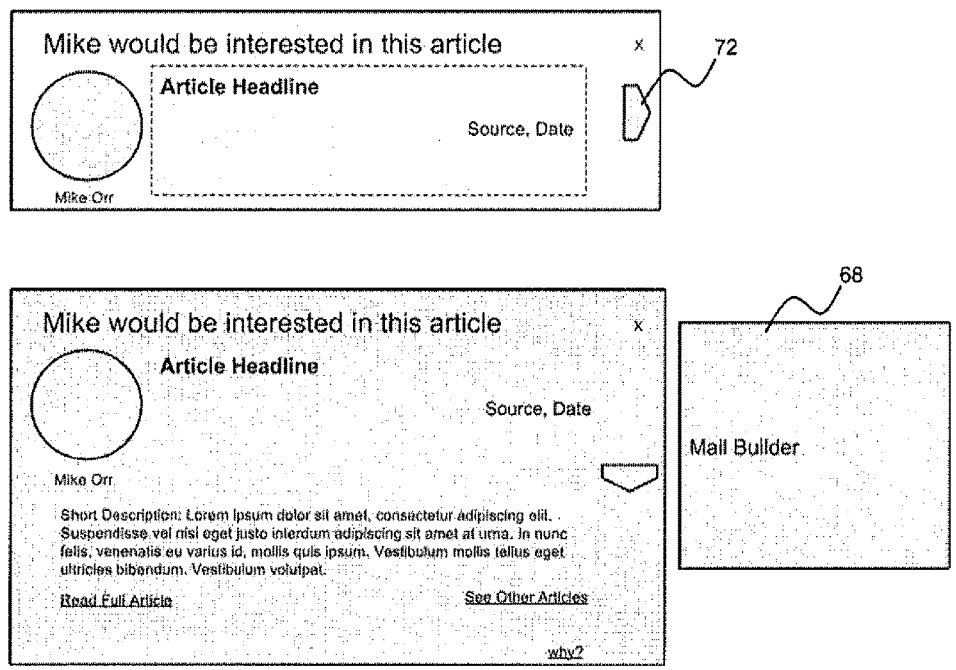
FIG. 10 is a diagram representing a possible user interface for accessing functions of the computer system of the present invention, namely for managing stream content matching.

FIG. 10 is a diagram representing a possible user interface for accessing functions of the computer system of the present invention, namely for managing stream content. A stream of matched content may be presented initially in a collapsed state, but can be expanded to show other items by clicking on an expand button (72). The user interface shown can be used by the targeting user to navigate through content collections by reviewing headlines and clicking on expanded summary views where desired. The mail builder (68) can be invoked when needed.

Figure 11:
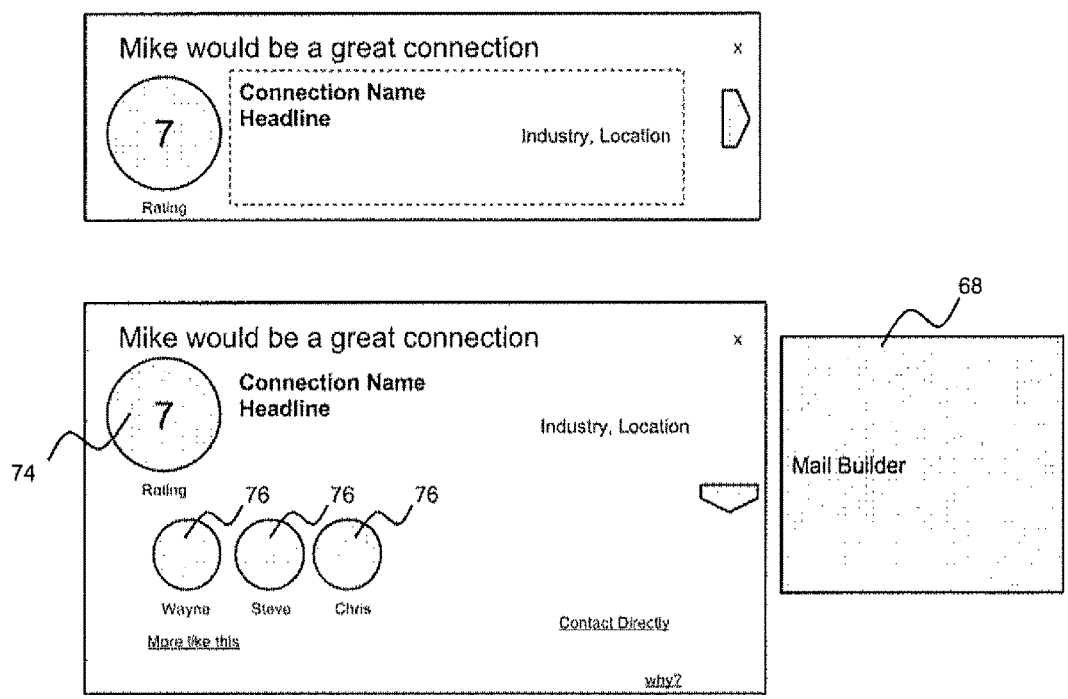
FIG. 11 is a diagram representing a possible user interface for accessing functions of the computer system of the present invention, namely for managing stream connection recommendations.

FIG. 11 is a diagram representing a possible user interface for accessing functions of the computer system of the present invention, namely for managing stream connection recommendations. This view is similar to that shown in FIG. 10 except that a connection recommendation rating may be shown (74). Other connection ratings are known, however, the connection rating method of the present invention is unique and innovative in that it is in part based on proximity of the connection interest profile to the user interest profile and the interest profiles of the user's current and prospective connection network. This rating provides guidance to a targeting user as to how suitable a recommended connection maybe for his/her network(s). Potential introducers may also be displayed (76), again these introducers may be based on proximity of connection that accounts for content interest.

Figure 12:
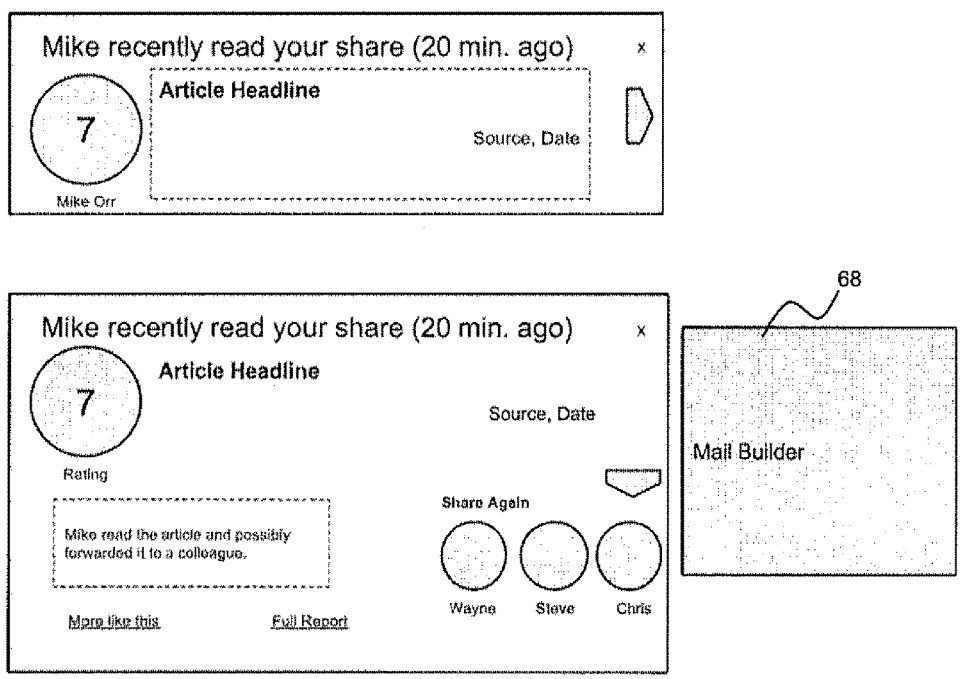
FIG. 12 is a diagram representing a possible user interface for accessing functions of the computer system of the present invention, in this case for accessing reports showing consumer engagement with reports.

FIG. 12 is a diagram representing a possible user interface for accessing functions of the computer system of the present invention, in this case accessing reports showing consumer engagement with reports. A summary report and a more detailed report is shown, providing an example of information that can be collected and presented regarding engagement of consumer with content.

System Implementations

In one aspect, the present invention may be implemented as a computer program. Server application software and databases may execute on both centralized computers and distributed, decentralized systems. The Internet or any other private or public network (for example a company's intranet) may be used as the network to communicate between the centralized servers, and the various computing devices and distributed systems that interact with it.

In one aspect of the computer program, the user interface may be provided to a user via a web server that is operable to deliver web pages. In particular the computer program includes a web presentment utility that is operable to generate a series of web pages that incorporate content generated by operation of the present invention.

The audience engagement platform of the present invention is operable to create and manage a profile for users, including their degree of engagement with topics or content items, and then to aggregate this information across users, so as to yield timely and valuable information such as trending of topics or content items with which users are willing to engage in a significant way. In another aspect of the invention, the audience engagement platform may incorporate a series of "engagement profiles" that enable the categorization and reporting on interest of users with topics or content items based on willingness to engage therewith.

The platform may also include an analytics engine (40) that may be linked to a reporting utility (42) that is operable to generate, based on output from the analytics engine (40)

a variety of reports or feeds relating for example to user preferences or level of engagement in regards to specific topics or content. The analytics engine (40) may be operable to analyze engagement between users including the content created by operation of the content delivery system (10) to then determine trends regarding user interest and engagement, and optionally generate reports or feeds based on this output. These reports may be consumed for example by content providers, customers of the operator of the platform, or sponsors of content. The feeds may be used for example automatically in connection with the operation of an ad server in regards to placement of ads in the web pages, including new web pages created dynamically by the web presentment utility (18) based on the content created by operation of the content delivery system (10).

In another aspect of the invention, the platform is configured to utilize the profiles described in connection with a matching engine, which may rely on information from the analytics engine (40), which incorporates one or more techniques for identifying two or more users who are likely to want to participate in a debate of a particular topic, or content item, and also that this debate is likely to be engaging for users.

The system of the present invention may also include an administration module (44) that is used to manage access of specific users to specific functions of the system. The administration module (44) manages for example assignment of administrative access to content providers and/or advertisement agencies acting on behalf of content providers or companies interested in sponsoring content, to various functions of the platform.

The platform may include a messaging and social media engine (46) or social media utility aspect of the present invention is best understood as a computer program or series of computer programs that provide the means for any manner of electronic communications between users of the system including but not limited to discussion threads, message boards, instant messaging, posts, blogs and so on. The social media utility (46) contemplates the use of any existing and any to be deployed form of social media. The social media utility (46) also enables the linking of the system of the invention to third party social media utilities such as FACEBOOK™ and others. In this way the social media utility (46) acts as an interface between the system and third party systems so as to enable the extraction of meta data from the social interactions occurring in relation to the third party system to the extent that these are between users of the present system. This way for example interactions between a user and another user, or with content, captured by the audience engagement platform, may be published to social networking sites, resulting for example in a social media feed indicating for example that a user participated in a video debate on a particular topic. Users are interested in obtaining access to content for their websites, and in turn publication of content may result in further interactions with the content, or content associated with that content.

The use of a web server, or client-side software program, and processing server may provide a means for distributed computing benefits, for example hosted application service provider (ASP) processing models or software-as-a-service (SaaS) application delivery models.

The present invention may also be operable over a wireless infrastructure. Present wireless devices are often provided with web browsing capabilities, whether through WAP or traditional means. The user interface of the present invention may be provided to the wireless devices, with processing occurring on the server side of the communication channel or any server associated with such a network.

The system of the present invention may also be implemented to a dedicated reader such as a KINDLE™ or KOBO™ reader, or an installed application like FLIPBOARD™. The implementation of the technology of the present invention by these products will essentially the same as an implementation of the present invention using a browser plug-in, except the interface will be different. The difference is that the interactions with the platform (10) occur through the native control system of the reader. This is the system that allows for chapter navigation and dictionary lookup among other functions.

In one aspect of the invention, the audience engagement platform is deployed as a SaaS application, and made available as a service to customers of the operator of the platform, for example based on a subscription service. The platform may be configured to integrate with customer web sites or web pages, for example using a suitable Application Programming Interface ("API") such as a JAVASCRIPT API.

It should be understood that the audience engagement platform of the present invention is configured to enable: (1) commenting by posting text, video and audio messages on web pages, including for example the web pages of a publisher, (2) rating and ranking by users, including of web pages, content items, information etc., (3) sharing content using social media, (4) viewing content consumer profiles, (5) embedding by publishers of publishers' pages of social engagement page elements, which may be implemented as widgets, (6) owners of web pages, such as publishers, to display various items including comments and user statistics, or trending content.

Generic System Implementation

It should be understood that the computer program may be run on a cloud network using configurations. For example, the computer program may be deployed using a cloud hosting facility.

Figure 13:
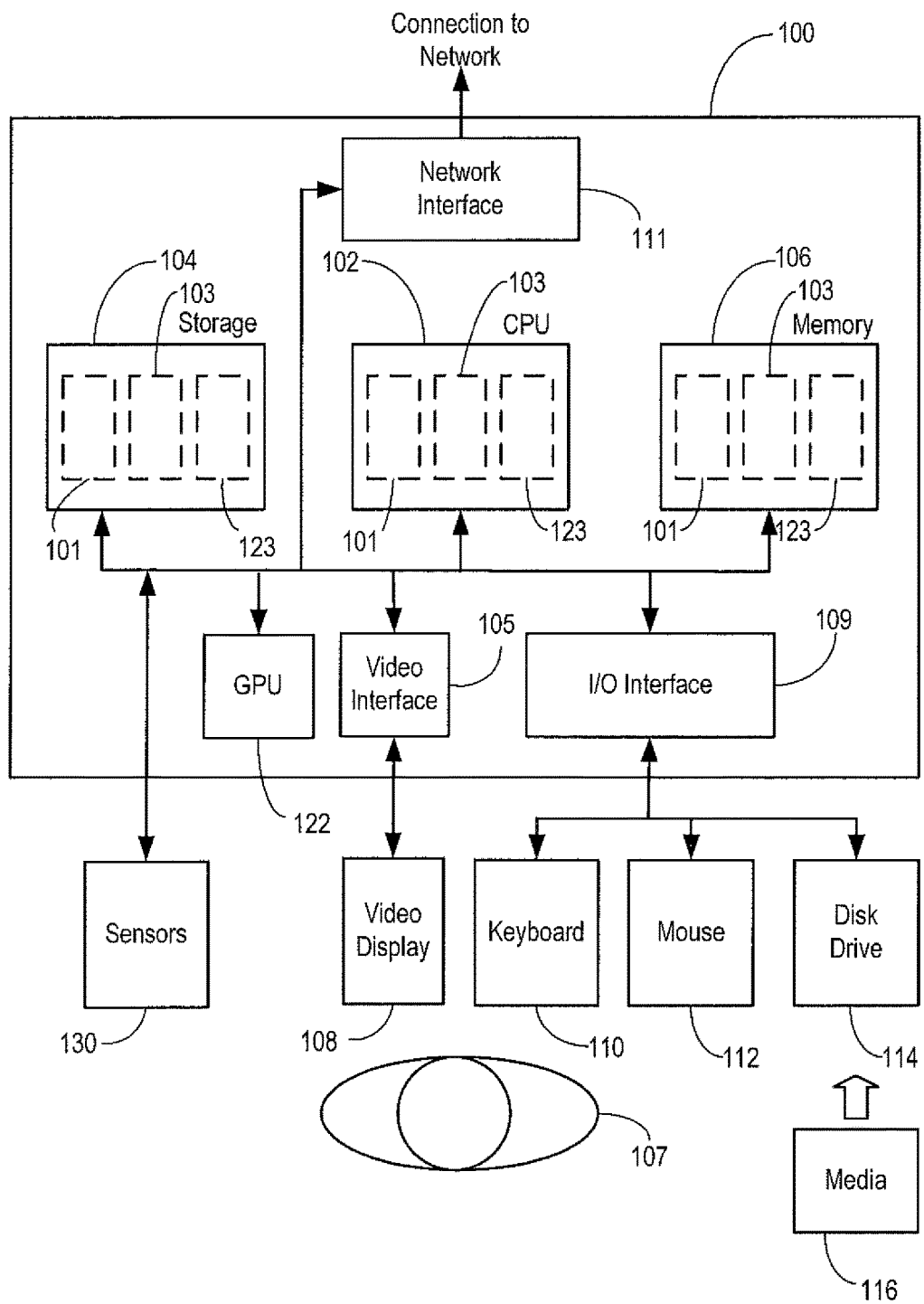
FIG. 13 is a generic computer system diagram, illustrating a possible implementation of the computer system of the present invention.

The present system and method may be practiced in various embodiments. A suitably configured computer device, and associated communications networks, devices, software and firmware may provide a platform for enabling one or more embodiments as described above. By way of example, FIG. 13 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors 130 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

It will be appreciated by those skilled in the art that other variations of the embodiments described herein may also be practiced without departing from the scope of the invention. Other modifications are therefore possible.

The invention claimed is:

1. A personalized content delivery computer system for providing a targeted audience comprising one or more users with content likely to be of interest to the targeted audience, the computer system comprising:
    at least one computing device comprising a processor and a network interface, the at least one computing device configured to:
        intelligently collect, by a tracking utility, content interest parameters for the targeted audience from a plurality of online sources via the network interface, the intelligent collecting including extracting user interests and keywords relevant to content interest from one or more target entities associated with the targeted audience, the one or more target entities including at least one of an external profile of the targeted audience, articles, and documents, and
        construct, by a content interest profile builder, a content interest profile for the targeted audience that includes a plurality of topics that the targeted audience is substantially likely to have a significant interest in, based on the extracted user interests and keywords;
        analyze, by a semantic engine, the extracted user interests and key-words; and
        synthesize, based on the extracted user interests and key-words, an additional key-word and/or an additional user interest;
        modify, by the content interest profile builder, the content interest profile for the targeted audience to include the synthesized additional keyword and/or additional user interest;
        responsive to a request to target the targeted audience with content likely to be of significant interest to the targeted audience, select a subset of content items from a candidate entity collection including content items within an information domain that is relevant to the targeted audience based on the content interest profile, the subset of content items being more likely to be of significant interest to the targeted audience than other content items in the candidate entity collection omitted from the subset of content items;
        generate a communication template personalized to at least one user in the targeted audience based on the content interest profile, wherein the communication template is personalized with respect to one or more of content format, a nature of relationship to the at least one user, tone, and computing device type of the at least one user;
        send, via the network interface, a communication to a computing device of the at least one user in the targeted audience using the personalized communication template, the communication containing the subset of content items and the communication being configured to be presented on the computing device of the at least one user in a manner personalized to the at least one user and the computing device of the at least one user.

2. The computer system of claim 1, wherein the subset of content items is generated in real time or near real time.

3. The computer system of claim 1, wherein the semantic engine synthesizes the additional key words and interests based on a dictionary of key words.

4. The computer system of claim 1, wherein the candidate entity collection comprises a variety of content objects, including at least one of social media profiles and digital content comprising at least one of news articles, videos and whitepapers.

5. The computer system of claim 1, wherein the system includes a dashboard that enables targeting users to supplement content interest profiles with information and insights from the targeting users regarding the targeted audience, thus enriching the content interest profile with personal insight.

6. The computer system of claim 5, wherein the dashboard enables a targeting user to deselect content items from the subset of content items.

7. The computer system of claim 6, wherein the content interest profile builder automatically updates an applicable content interest profile based on personal insights or insights generated from deselection of content items from the subset of content items.

8. The computer system of claim 1, wherein the content matching utility dynamically generates for the targeted audience a matching profile for optimizing the matching of the subset of content items to the current content interest profile for the targeted audience.

9. The computer system of claim 1, wherein the structure of the content interest profile and of the matching profile is complementary, thereby enabling close matching of content to interests, and also enabling matching of different types of content.

10. The computer system of claim 1, wherein the system identifies common interests between the targeting user and the targeted audience, thereby providing commonality between the targeting user and the targeted audience for effective engagement between the targeting user and the targeted audience.

11. The computer system of claim 1, wherein the content delivery platform includes a suggestion utility that suggests content items from the subset of content items for delivery to the targeted audience, based on the content interest profile or communication history for the targeted audience and the targeting user.

12. The computer system of claim 1, wherein the targeting user has a plurality of contacts, and the system prioritizes contacts based on opportunities for targeting user to engage with contacts based on content interests.

13. The computer system of claim 1, wherein the targeted audience comprises at least two of the one or more other users, and the system clusters the targeted audience automatically, and iteratively, into groups with similar interests.

14. The computer system of claim 13, wherein the groups are clustered based on common interests amongst a cluster, or common interests amongst a cluster and additionally the targeting user.

15. The computer system of claim 1, wherein the inference engine is configured to extract content interest parameters from different types of target entities, including different online profiles associated with different Internet platforms including social networking platforms, data feeds from micro-blogging sites, content websites, and online news services.

16. The computer system of claim 13, wherein the content interest profile builder automatically connects to sources of target entities, looks for updates, extracts new content interest parameters from updates, and automatically updates the applicable content interest profile.

17. The computer system of claim 3, wherein the semantic engine is further configured to:
process the key words and interests based on context dependent standard terminology,
identify related concepts, and
categorize the concepts or define key word relationships, in order to generate insights regarding topics of interest to the targeted audience.

18. The computer system of claim 1 wherein the inference engine is configured to analyze a current content interest profile, and based on this analysis selectively access or dynamically generate one or more inference models for augmenting the content interest profile so as to predict parameters for additional target entities that will enable enrichment of the content interest profile.

19. The computer system of claim 16, wherein the system is configured to iteratively analyze the content interest profiles, and search for and acquire information from additional target entities, and process the additional target entities using the content interest profile builder, and, based on the information from the additional target entities, update the applicable content interest profile.

20. The computer system of claim 1, wherein the inference engine implements event dependent rules for varying interest levels, and applies applicable rules upon detection of an associated event.

21. The computer system of claim 1, wherein the system implements a series of rules for scoring content items, and based on such scoring rules the content matching scores content items and ranks content items, applies a content item number threshold, and presents a number of top ranked content items based on the number threshold as content items in the subset of content items.

22. A method performed by at least one computing device for providing a targeted audience comprising one or more users with content likely to be of interest to the target audience, the method comprising:
identifying, by a content targeting utility, the targeted audience;
collecting, by a tracking utility, content interest parameters for the targeted audience from a plurality of online sources via the network interface, the collecting including extracting user interests and keywords relevant to content interest from one or more target entities associated with the targeted audience, the one or more target entities including at least one of an external profile of targeted audience, articles, and documents;
constructing, by a content interest profile builder, a content interest profile for the targeted audience that includes a plurality of topics that the targeted audience is substantially likely to have a significant interest in, based on the extracted user interests and keywords,
analyzing, by a semantic engine, the extracted user interests and keywords,
synthesizing an additional key-word and/or an additional user interest based on the extracted user interests and key-words,
modifying, by the content interest profile builder, the content interest profile for the targeted audience to include the synthesized additional keyword and/or additional user interest;
responsive to a request to target the targeted audience with content likely to be of significant interest to the targeted audience:
selecting, by the content matching utility, a subset of content items from a candidate entity collection including content items within an information domain that is relevant to the targeted audience based on the content interest profile, the subset of content items being more likely to be of significant interest to the targeted audience than other content items in the candidate entity collection omitted from the subset of content items;
generating a communication template personalized to at least one user in the targeted audience based on the content interest profile, wherein the communication template is personalized with respect to one or more of content format, a nature of the relationship to the at least one user, tone, and computing device type of the at least one user;
sending, via a network interface, a communication to a computing device of the at least one user in the target audience using the personalized communication template, the communication containing the subset of content items and the communication being configured to be presented on the computing device of the at least one user in a manner personalized to the at least one user and the computing device of the at least one user.

23. The computer system of claim 1, wherein the inference engine enriches the applicable content interest profile by identifying related inference models, and wherein the models comprise the collection of content interest attributes generated by the content interest profile builder, and wherein the system predicts, based on analysis of similar target entities, a further collection of content interest attributes.

24. The computer system of claim 1, further comprising a learning utility configured to process a feed of interaction data generated by a tracking utility, wherein the learning utility is further configured to update the applicable content interest profile with a stronger association of a specific interest.

25. The computer system of claim 1, further comprising a tracking utility for monitoring success of distribution activities.

26. The computer system of claim 1, further comprising an indexing utility configured to process content items from different data sources and store the content items in a content database, wherein each stored content item comprises one or more entity attributes.

27. The computer system of claim 1, wherein the content interest profile builder is further configured to perform a semantic analysis of the candidate entity collection to assess properties of the interests, and wherein the content interest profile builder is further configured to build the assessed properties into the applicable content interest profile.

28. The computer system of claim 1, further comprising a communication utility configured to automatically select a template reflective of dimensions of the applicable content interest profile.

* * * * *